(12) United States Patent
Moon et al.

(10) Patent No.: US 12,406,667 B2
(45) Date of Patent: Sep. 2, 2025

(54) METHOD OF PROCESSING DIALOGUE, USER TERMINAL, AND DIALOGUE SYSTEM

(71) Applicants: Hyundai Motor Company, Seoul (KR); Kia Corporation, Seoul (KR)

(72) Inventors: Jaemin Moon, Yongin-Si (KR); Minjae Park, Seongnam-Si (KR); Sungwang Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 293 days.

(21) Appl. No.: 18/080,470

(22) Filed: Dec. 13, 2022

(65) Prior Publication Data

US 2023/0317072 A1  Oct. 5, 2023

(30) Foreign Application Priority Data

Apr. 1, 2022 (KR) ........................ 10-2022-0041239

(51) Int. Cl.
*G10L 15/22* (2006.01)
*G06F 3/04847* (2022.01)
*G06F 3/16* (2006.01)
*G10L 15/30* (2013.01)
*G06F 40/295* (2020.01)
*G06F 40/30* (2020.01)
*G10L 15/18* (2013.01)

(52) U.S. Cl.
CPC .......... *G10L 15/22* (2013.01); *G06F 3/04847* (2013.01); *G06F 3/167* (2013.01); *G10L 15/30* (2013.01); *G06F 40/295* (2020.01); *G06F 40/30* (2020.01); *G10L 15/1815* (2013.01); *G10L 2015/223* (2013.01); *G10L 2015/228* (2013.01)

(58) Field of Classification Search
CPC ..... G10L 15/22; G10L 15/30; G10L 15/1815; G10L 2015/223; G10L 2015/228; G06F 3/04847; G06F 3/167; G06F 40/295
USPC ................... 704/200, 231, 246; 381/86, 110
See application file for complete search history.

(56) References Cited

U.S. PATENT DOCUMENTS

| | | | |
|---|---|---|---|
| 2020/0216086 A1 | 7/2020 | Lenke et al. | |
| 2021/0291619 A1* | 9/2021 | Aghniaey | B60W 50/10 |
| 2023/0206915 A1* | 6/2023 | Mohajer | G10L 15/22 |
| | | | 704/251 |

FOREIGN PATENT DOCUMENTS

| | | |
|---|---|---|
| JP | 2020-129290 A | 8/2020 |
| JP | 2020-157854 A | 10/2020 |
| JP | 2021-24295 A | 2/2021 |
| JP | 2021-111056 A | 8/2021 |
| KR | 102132058 B1 | 7/2020 |

* cited by examiner

*Primary Examiner* — George C Monikang
(74) *Attorney, Agent, or Firm* — Banner & Witcoff, Ltd.

(57) ABSTRACT

The method of processing a dialogue may include: monitoring a setting value for a setting item of a vehicle; in response to the setting value not matching a target value for the setting item, generating a system speech based on the target value and the setting value; and transmitting the generated system speech to a user terminal associated with the vehicle. The target value for the setting item may be determined based on a historic usage pattern for the setting item on the user terminal.

20 Claims, 21 Drawing Sheets

FIG. 11

| ELEMENT | USER | RELATED FUNCTION | SETTING TARGET | CURRENT | TARGET |
|---|---|---|---|---|---|
| VALUE | HONG GIL-DONG | AIR CONDITIONER | TEMPERATURE | 24 | 26 |
| SYSTEM SPEECH | MR. HONG GIL-DONG | AIR CONDITIONER | TEMPERATURE | SHALL I RAISE | |

FIG. 14

| ELEMENT | USER | RELATED FUNCTION | SETTING TARGET | CURRENT | TARGET |
|---|---|---|---|---|---|
| VALUE | HONG GIL-DONG | AIR CONDITIONER | TEMPERATURE | 26.5 | 26 |
| SYSTEM SPEECH | MR. HONG GIL-DONG | AIR CONDITIONER | TEMPERATURE | SHALL I LOWER | |

FIG. 17

| ELEMENT | USER | RELATED FUNCTION | SETTING TARGET | CURRENT | TARGET |
|---|---|---|---|---|---|
| VALUE | HONG GIL-DONG | REGENERATIVE BRAKING SYSTEM | AMOUNT OF REGENERATIVE BRAKING | 4 | 2 |
| SYSTEM SPEECH | MR. HONG GIL-DONG | REGENERATIVE BRAKING | LEVEL | SHALL I LOWER | |

FIG. 20

| ELEMENT | USER | RELATED FUNCTION | SETTING TARGET | CURRENT | TARGET |
|---|---|---|---|---|---|
| VALUE | KIM TAE-RI | REGENERATIVE BRAKING SYSTEM | AMOUNT OF REGENERATIVE BRAKING | 3 | 5 |
| SYSTEM SPEECH | MS. KIM TAE-RI | REGENERATIVE BRAKING | LEVEL | SHALL I RAISE | |

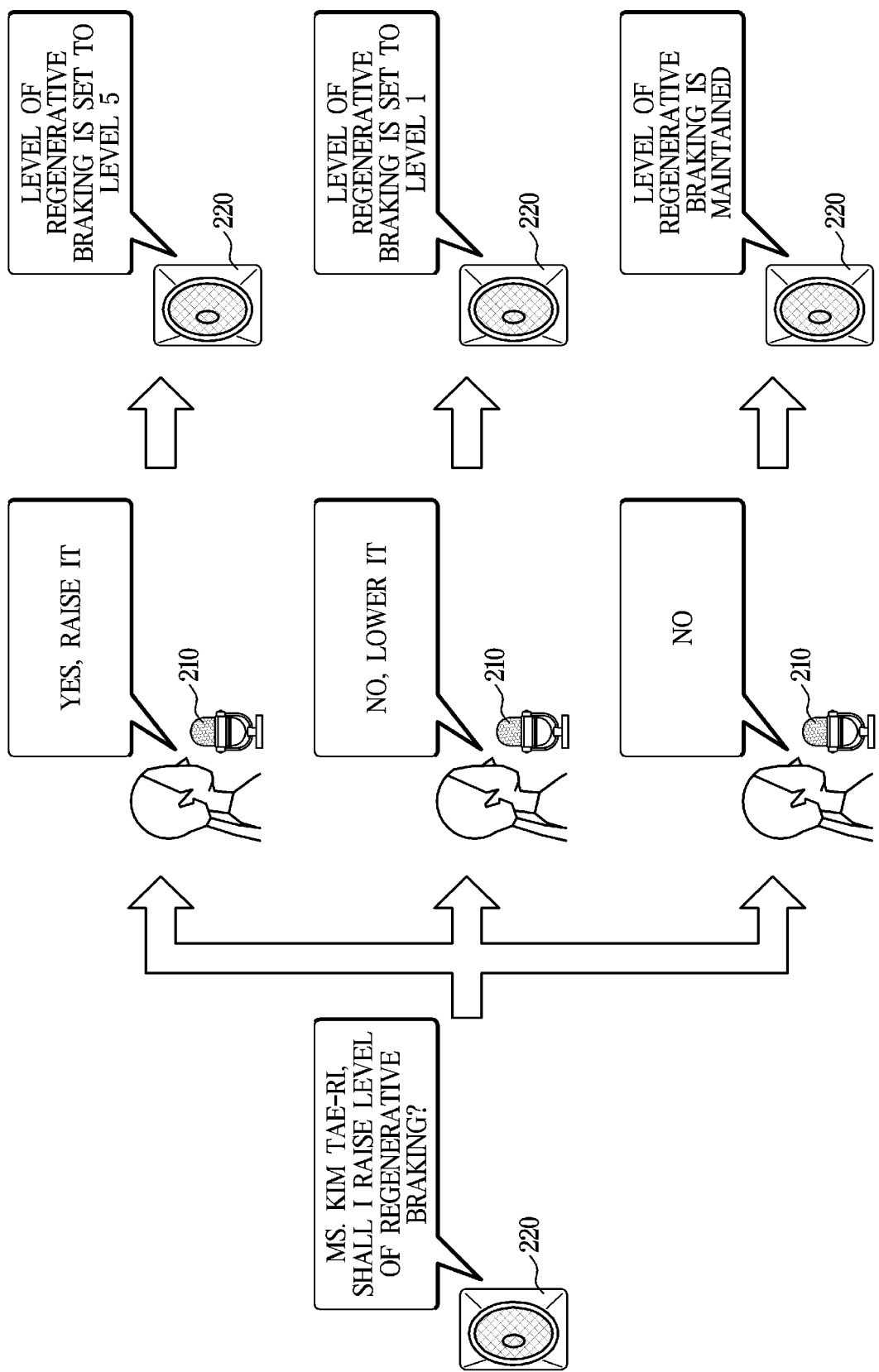

METHOD OF PROCESSING DIALOGUE, USER TERMINAL, AND DIALOGUE SYSTEM

CROSS-REFERENCE TO RELATED APPLICATION

This application is based on and claims priority to Korean Patent Application No. 10-2022-0041239, filed on Apr. 1, 2022 in the Korean Intellectual Property Office, the disclosure of which is incorporated herein by reference.

TECHNICAL FIELD

The disclosure relates to speech processing, and more specifically to a dialogue system in a vehicle.

BACKGROUND

A dialogue system is capable of identifying what is intended by a user from a user's speech. The dialogue system is used in a variety of electronic devices used in everyday life such as mobile devices, home appliances, vehicles, etc., allowing execution of various functions corresponding to a user's speech.

Settings related to various functions of electronic devices may be made through a manually operated input device, and most setting menus have a depth of at least two steps. As the depth for the settings increases, user convenience may be reduced.

Also, for an electronic device having a variety of functions and input methods like a vehicle, a user may not know an accurate input method of each function.

SUMMARY

An aspect of the disclosure provides a method of processing a dialogue, a dialogue system and a user terminal that may, when a setting value for a predetermined setting item is different from a user's setting pattern, preemptively output a system speech for confirming an intention to change the setting value, thereby improving usability of the user terminal through active use of the dialogue system.

Additional aspects of the disclosure will be set forth in part in the description which follows and, in part, will be obvious from the description, or may be learned by practice of the disclosure.

A method, according to one or more embodiments of the present disclosure, may include: monitoring a setting value for a setting item of a vehicle; in response to the setting value not matching a target value for the setting item, generating a system speech based on the target value and the setting value; and transmitting the generated system speech to a user terminal associated with the vehicle. The target value for the setting item may be determined based on a historic usage pattern for the setting item on the user terminal.

Monitoring the setting value for the setting item may be include, in response to the setting value for the setting item being input into the user terminal, comparing the input setting value to the target value.

Monitoring the setting value for the setting item may include, in response to a function corresponding to the setting item being executed in the user terminal, comparing the setting value for the setting item with the target value.

The setting item may be settable by a manual input having a plurality of steps in the user terminal.

The target value for the setting item may be determined as a value having a highest frequency of use in the historic usage pattern for the setting item.

Generating the system speech may include at least one of: in response to the setting value being less than the target value for the setting item, generating the system speech for confirming whether to increase the setting value for the setting item, or, in response to the setting value being greater than the target value for the setting item, generating the system speech for confirming whether to decrease the setting value for the setting item.

Generating the system speech may include generating the system speech by including information about the setting value for the setting item.

The generated system speech may be preemptively output through the user terminal, before a speech input is received by the user terminal from a user.

The method may further include storing the historic usage pattern for the setting item, for each of a plurality of user terminals or for each of a plurality of users.

The historic usage pattern for the setting item may be stored according to at least one of time information, season information, location information, or occupant information.

A user terminal, according to one or more embodiments of the present disclosure, may include: an input interface configured to receive, from a user, a setting value for a setting item of a vehicle; a controller configured to execute a function corresponding to the setting item according to the received setting value; a communicator configured to receive, in response to the setting value not matching a target value for the setting item, a system speech from a dialogue system of the vehicle; a speaker configured to output the received system speech; and a microphone configured to receive, from the user, a speech input. The system speech may be generated based on the target value and the monitored setting value.

The setting item may be set by a manual input having a plurality of steps in the user terminal.

The target value for the setting item may be determined as a value having a highest frequency of use in a historic usage pattern for the setting item.

The system speech may be output for confirming one of: whether to increase the setting value for the setting item, in response to the setting value for the setting item being less than the target value for the setting item, or whether to decrease the setting value for the setting item in response to the setting value for the setting item being greater than the target value for the setting item.

The system speech may include information about the setting value for the setting item.

The system speech may be preemptively output through the speaker, before the speech input is received by the microphone.

A dialogue system, according to one or more embodiments of the present disclosure, may include: a storage configured to store a historic usage pattern for a setting item on a user terminal; a controller configured to: monitor a setting value for the setting item; and in response to the setting value not matching a target value, which is determined based on the historic usage pattern for the setting item, generate a system speech based on the target value and the setting value; and a communicator configured to transmit the generated system speech to the user terminal.

The controller may be configured to monitor the setting value in response to the setting value being input to the user terminal.

The controller may be configured to monitor the setting value in response to a function corresponding to the setting item being executed in the user terminal.

The setting item may be set by a manual input having a plurality of steps in the user terminal.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 11 is a diagram illustrating an example of an operation of generating a system speech by a dialogue system;

FIG. 14 is a diagram illustrating another example of an operation of generating a system speech by a dialogue system;

FIG. 17 is a diagram illustrating an example of an operation of generating a system speech by a dialogue system;

FIG. 20 is a diagram illustrating an example of an operation of generating a system speech by a dialogue system; and FIG. 21 is a diagram illustrating an example of dialogues between a user and a dialogue system.

DETAILED DESCRIPTION

Figure 1:
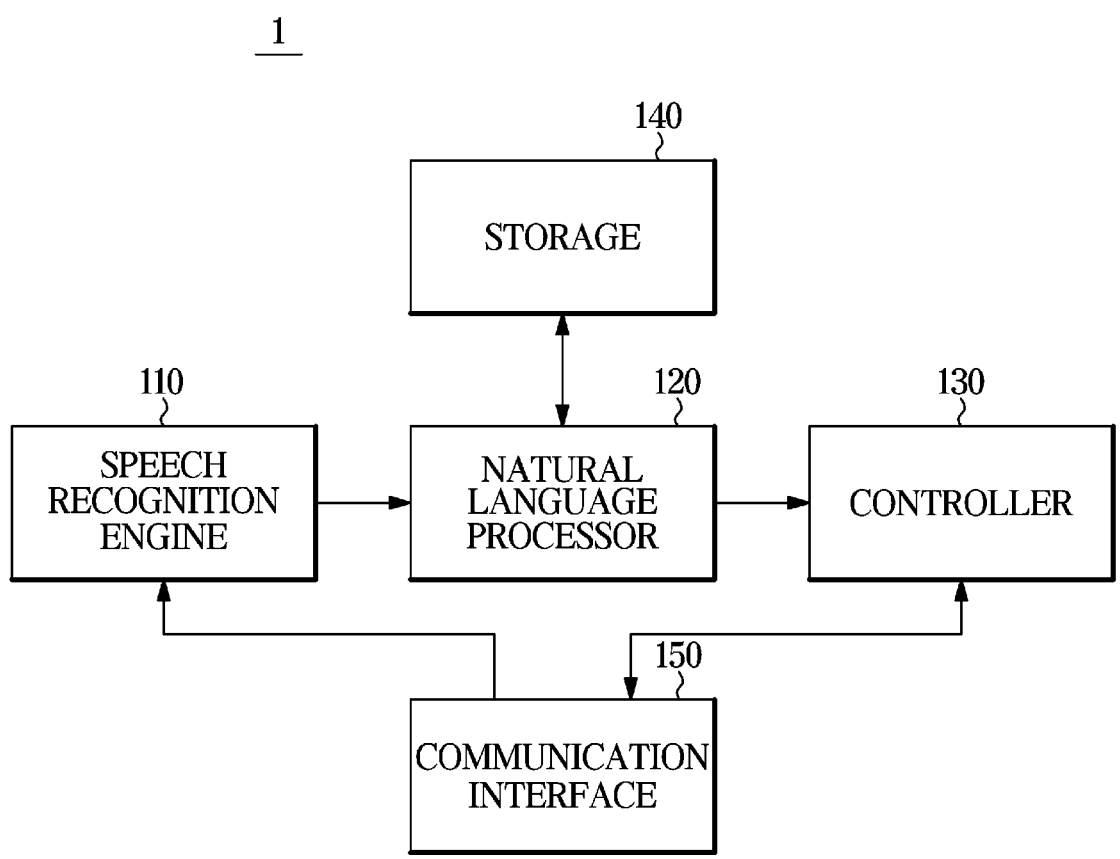
FIG. 1 is a block diagram illustrating operations of a dialogue system.

The embodiments set forth herein and illustrated in the configuration of the disclosure are only preferred embodiments, so it should be understood that they may be replaced with various equivalents and modifications at the time of the disclosure.

Like reference numerals throughout the specification denote like elements.

Terminologies used herein are for the purpose of describing particular embodiments only and is not intended to limit the disclosure. It is to be understood that the singular forms are intended to include the plural forms as well, unless the context clearly dictates otherwise.

It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. For example, without departing from the technical spirit or essential features of the disclosure, a first element may be referred to as a second element, and also a second element may be referred to as a first element.

Descriptions shall be understood as to include any and all combinations of one or more of the associated listed items when the items are described by using the conjunctive term "~ and/or ~," or the like.

Further, the terms such as "~part", "~device", "~block", "~member", "~module", and the like may refer to a unit for processing at least one function or act. For example, the terms may refer to at least a process processed by at least one hardware component, such as a field-programmable gate array (FPGA) and/or an application specific integrated circuit (ASIC), or software stored in memories or processors.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of A, B, or C" may include only A, only B, only C, both A and B, both A and C, both B and C, or all of A, B and C.

Hereinafter, embodiments of a dialogue system and a method of processing a dialogue are described in detail with reference to the accompanying drawings.

FIG. 1 is a block diagram illustrating operations of a dialogue system.

Referring to FIG. 1, a dialogue system 1 may include a speech recognition engine 110, a natural language processor 120, a controller 130, a storage 140 and a communication interface 150. The speech recognition engine 110 may convert a user's speech, input to a user terminal, into text. The natural language processor 120 may classify a domain or an intent of the user's speech based on the converted text and perform entity extraction and slot tagging. The controller 130 may generate a system response corresponding to the user's speech based on an output of the natural language processor 120. The storage 140 may store a setting pattern for a setting item of the user terminal. The communication interface 150 may communicate with the user terminal. Each component depicted in FIG. 1 and other drawings may be implemented with hardware (e.g., a processor, memory, storage, etc.), software (e.g., a program, instructions, logic, algorithm, etc.), or a combination of both.

The speech recognition engine 110 may be implemented with a speech to text (STT) engine, and perform conversion into text by applying a speech recognition algorithm to a user's speech.

For example, the speech recognition engine 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition engine 110 may convert the user's speech into the text based on learning where deep learning or machine learning is applied. A way of converting the user's speech into the text by the speech recognition engine 110 is not limited thereto, and a variety of speech recognition techniques may be applied to convert the user's speech into the text.

The natural language processor 120 may apply a natural language understanding (NLU) technique to determine a user intention included in the text. Accordingly, the natural language processor 120 may include an NLU engine that is capable of determining the user intention by applying the NLU technique to an input sentence. Here, the text output by the speech recognition engine 110 may be a sentence that is input into the natural language processor 120.

For example, the natural language processor 120 may recognize a named entity from the input sentence. The named entity may be a proper noun such as a name of an individual person, place, organization, time, day, currency, and the like. Named-entity recognition (NER) may identify an entity in a sentence and classifying a type of the identified entity. A keyword may be extracted from a sentence through named-entity recognition to understand the meaning of the sentence.

Also, the natural language processor 120 may determine a domain from the input sentence. The domain may identify a subject matter of the user's speech. For example, domains representing various subject matters such as vehicle control, schedule, information about weather or traffic conditions, text transmission, navigation, music, etc., may be determined based on the input sentence.

In addition, the natural language processor 120 may classify an intent corresponding to the input sentence and extract an entity required to perform the corresponding intent.

For example, if the input sentence is "turn on the air conditioner," a domain may be [vehicle control] and an intent may be [turn on_air conditioner]. Here, an entity required to perform control corresponding to such intent may be [temperature, air volume].

However, terms used and definitions thereof may vary for each dialogue system. Accordingly, terms different from those used in the embodiments described above or to be described below may also be encompassed by a scope of the disclosure, as long as the terms have the same or similar meaning or role in a dialogue system.

As described above, the operation of extracting required information such as an intent, domain, entity, etc., from the input sentence by the natural language processor 120 may be performed by using a training model based on machine learning or deep learning.

The controller 130 may generate a system response corresponding to the user's speech to provide a service corresponding to a user intention. The system response may include a system speech output as a response to the user's speech and a signal for executing an intent corresponding to the user's speech.

Alternatively, as will be described later, if a predetermined condition is satisfied, the controller 130 may generate and preemptively output a system speech before the user's speech is input.

The communication interface 150 may wirelessly communicate with a base station or an access point (AP), and exchange data with external devices through the base station or access point.

For example, the communication interface 150 may wirelessly communicate with an access point using Wi-Fi (Wi-Fi®, IEEE 802.11 standard), or communicate with a base station using a code division multiple access (CDMA), wideband CDMA (WCDMA), global system for mobile communication (GSM), long term evolution (LTE), 5G, Wibro, and the like.

The dialogue system 1 may include at least one memory storing a program performing the aforementioned operations or operations to be described later and at least one processor implementing a stored program.

Each of the speech recognition engine 110, the natural language processor 120, and the controller 130 may use separate memories and processors, or share a memory and a processor.

That is, the speech recognition engine 110, the natural language processor 120 and the controller 130 may be distinguished based on respective operation, and may not necessarily be physically separated. Accordingly, as long as a constituent component performs operations of the speech recognition engine 110, the natural language processor 120 or the controller 130 described above or to be described below, the constituent component may also be encompassed by a scope of the disclosure, regardless of a name of the constituent component.

The storage 140 may also use a memory different from the memory storing a program performing the operations of the speech recognition engine 110, the natural language processor 120 and the controller 130, or share the same memory.

Figure 2:
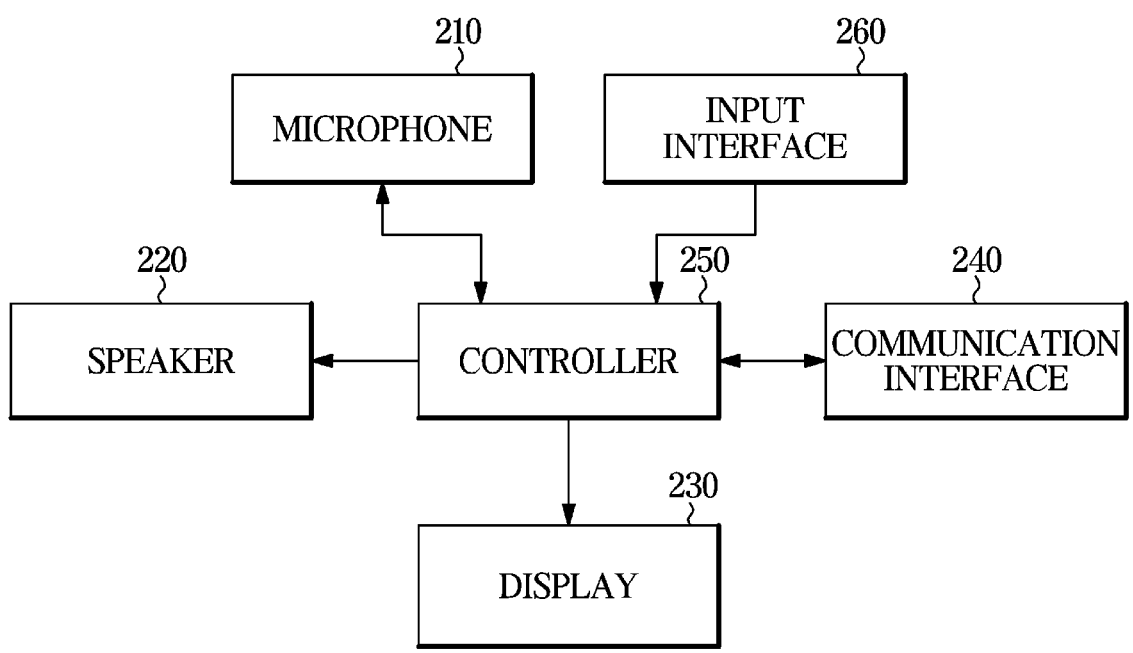
FIG. 2 is a block diagram illustrating operations of a user terminal.
Figure 3:
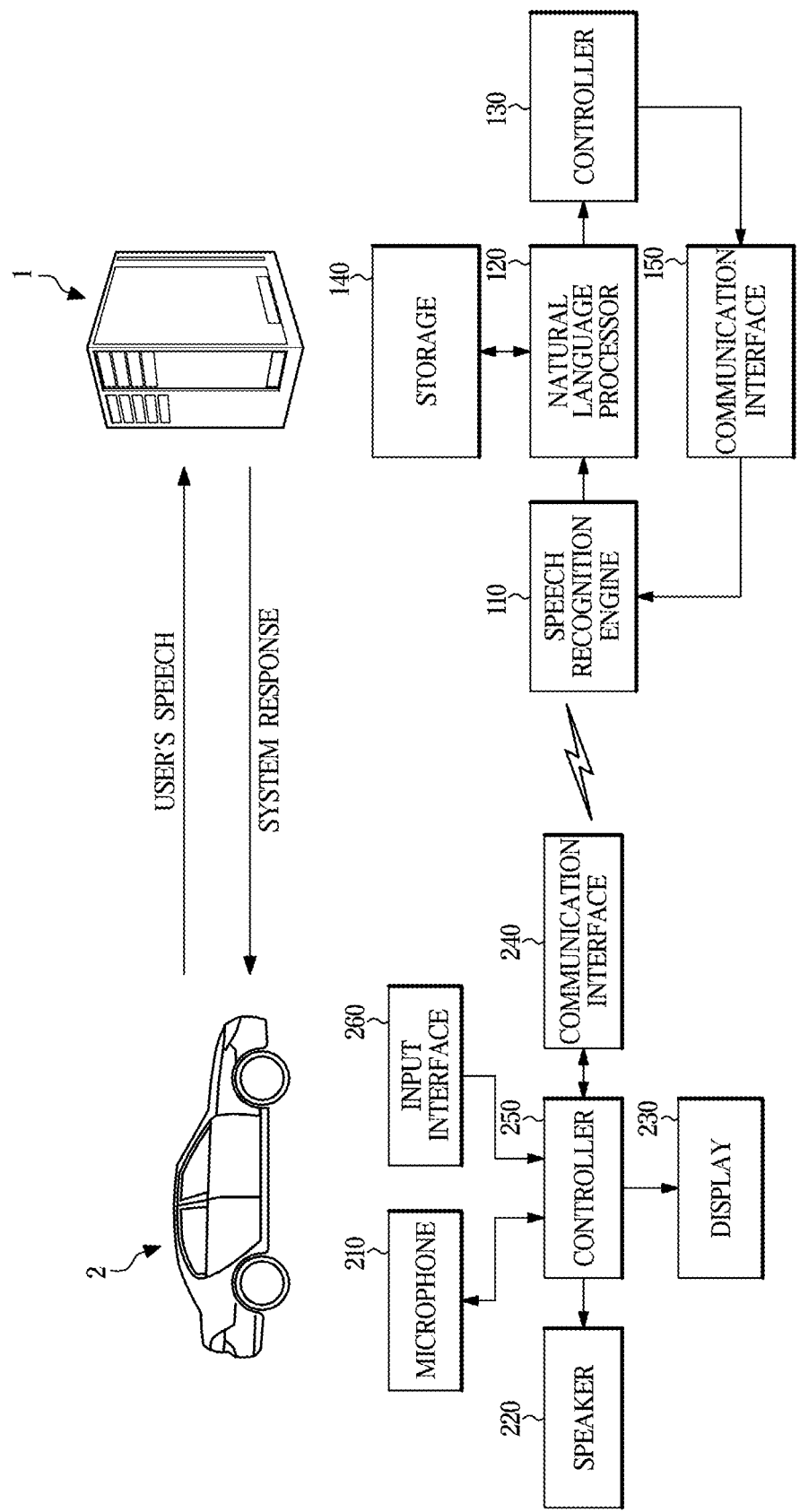
FIGS. 3 and 4 are diagrams illustrating a relationship between a dialogue system and a user terminal.
Figure 4:
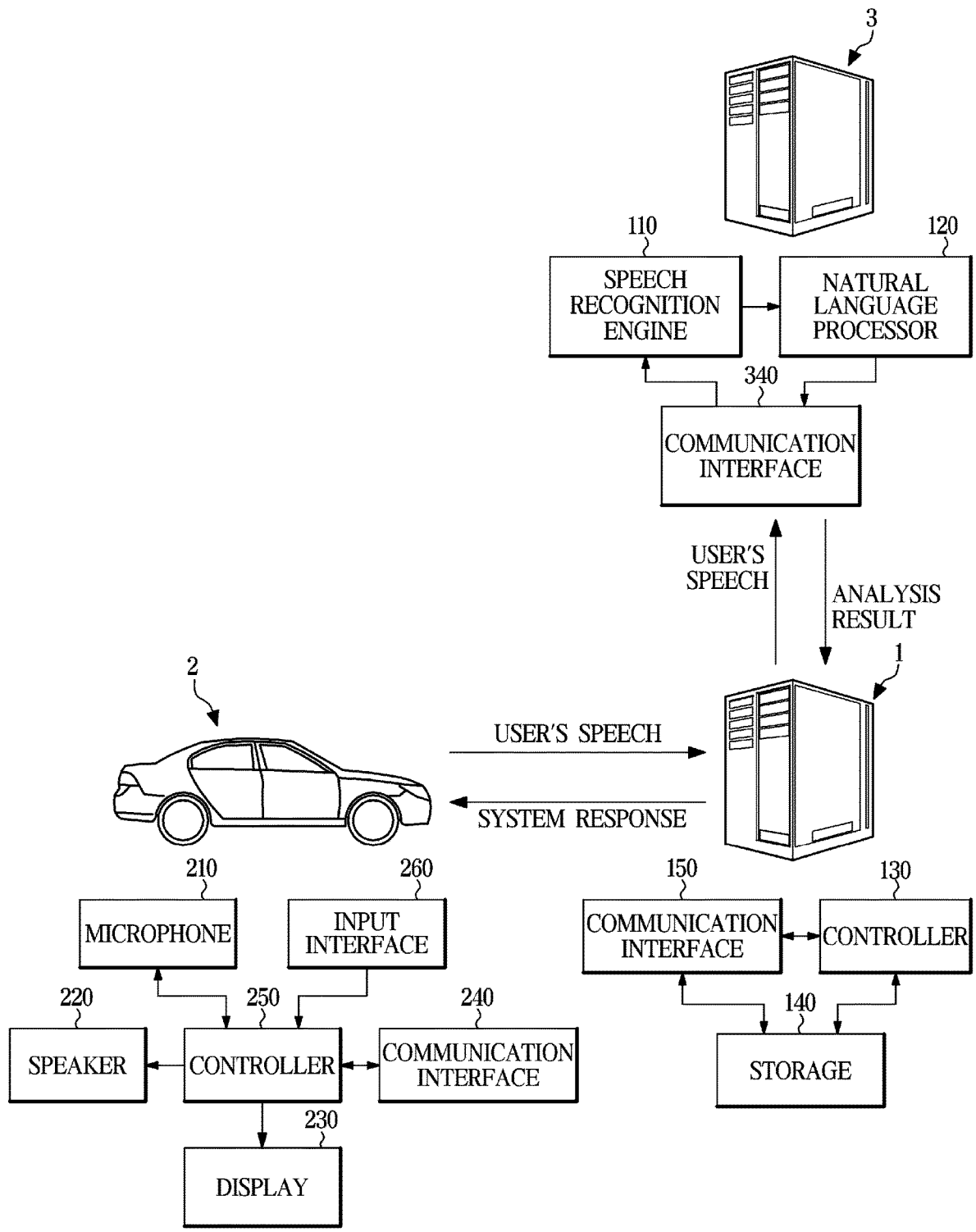

FIG. 2 is a block diagram illustrating operations of a user terminal. FIGS. 3 and 4 are diagrams illustrating a relationship between a dialogue system and a user terminal.

A user terminal 2 may serve as a gateway between a user and the dialogue system 1. For example, the user terminal 2 may be a mobile device such as a smartphone, a tablet personal computer (PC), a laptop, a wearable device (e.g., a smartwatch, smart glasses, etc.), a home appliance that includes a microphone and a speaker (e.g., a television, a refrigerator, an air conditioner, an air purifier, a vacuum cleaner, a washing machine, etc.), and/or a smart speaker (e.g., an artificial intelligence (AI) speaker).

Alternatively, the user terminal 2 may be a vehicle. A user's speech may be input through a microphone provided in the vehicle and be transmitted to the dialogue system 1 through a communication interface provided in the vehicle.

Also, after a system response is transmitted from the dialogue system 1, a speaker, a display, or other constituent components, provided in the vehicle, may be controlled to perform processing corresponding to the system response.

Referring to FIG. 2, the user terminal 2 may include a microphone 210, a speaker 220, a display 230, a communication interface 240, a controller 250, and an input interface 260.

The communication interface 240 may include a wireless communication interface exchanging data with external devices wirelessly. The communication interface 240 may include a wired communication interface exchanging data with external devices by wire.

The wired communication interface may exchange data with external devices connected through a Universal Serial Bus (USB) terminal, an auxiliary (AUX) terminal, and the like.

The wireless communication interface may wirelessly communicate with a base station or an access point (AP), and exchange data with external devices through a base station or an access point.

For example, the wireless communication interface may wirelessly communicate with an access point using Wi-Fi (Wi-Fi®, IEEE 802.11 standard), or communicate with a base station using a CDMA, WCDMA, GSM, LTE, 5G, Wibro, and the like.

The wireless communication interface may communicate with external devices. For example, the wireless communication interface may exchange data with external devices within a short distance using Wi-Fi direct, Bluetooth (Bluetooth®, IEEE 802.15.1 standard), Zigbee (Zigbee®, IEEE 802.15.4 standard), etc.

For example, if the user terminal 2 is implemented as a vehicle, the communication interface 240 may communicate with a mobile device located inside the vehicle through a Bluetooth communication, thereby receiving information (e.g., user images, user speech, contact numbers, schedules, etc.) obtained by or stored in the mobile device. The communication interface 240 may communicate with the dialogue system 1 through Wi-Fi, 4G or 5G communication, thereby transmitting a user's speech and receiving a system response corresponding to the user's speech.

A user's speech may be input to the microphone 210. If the user's speech is input, the microphone 210 may convert the user's speech in a form of sound wave into an audio signal which is an electrical signal, and output the audio signal. Accordingly, the user's speech after being output from the microphone 210 may be processed as an audio signal form.

The speaker 220 may output a variety of audios related to the system response received from the dialogue system 1. The speaker 220 may output a system speech transmitted from the dialogue system 1, and output a content signal corresponding to the system response.

Regardless of the system response, music, radio or audio of multimedia content may be output, and audios for route guidance while a navigation function is operating may be output.

The display 230 may display various information related to the system response received from the dialogue system 1. The display 230 may display the system speech, output through the speaker 220, as text, and if a user selection from a plurality of items is required to execute an intent corresponding to a user's speech, display a list of the plurality of items.

In addition, the display 230 may display information required to perform other functions of the user terminal 2, such as outputting multimedia content, regardless of the system response, or display information for guiding a manual input through the input interface 260.

The user terminal 2 may include the input interface 260 for manually (e.g., operated by hand) receiving a user command, in addition to the microphone 210. The input interface 260 may be provided as a jog shuttle, a button, and/or a touchpad. If the input interface 260 is provided as a touchpad, the input interface 260 together with the display 230 may be implemented as a touchscreen.

The controller 250 may control the constituent components of the user terminal 2 so that the aforementioned operations and operations to be described below are performed. The controller 250 may include, for example, a microprocessor.

As shown in FIG. 3, the user's speech input through the microphone 210 of the user terminal 2 may be transmitted to the dialogue system 1 through the communication interface 240.

If the communication interface 150 of the dialogue system 1 receives the user's speech and the speech recognition engine 110 and the natural language processor 120 output an analysis result of the user's speech, the controller 130 may generate an appropriate system response based on the analysis result of the user's speech, and transmit the system response to the user terminal 2 through the communication interface 150.

The dialogue system 1 may be implemented as a server. The dialogue system 1 need not be implemented as a single server, and may be implemented as a plurality of servers physically separated.

Also, as shown in FIG. 4, the speech recognition engine 110 and the natural language processor 120 may be implemented as a separate external system 3. In this case, if the dialogue system 1 receives a user's speech from the user terminal 2, the dialogue system 1 may transmit the user's speech to the external system 3 and receive an analysis result of the user's speech from the external system 3.

The controller 130 of the dialogue system 1 may generate an appropriate system response corresponding to the user's speech based on the received analysis result, and transmit the generated system response to the user terminal 2 through the communication interface 150.

Figure 5:
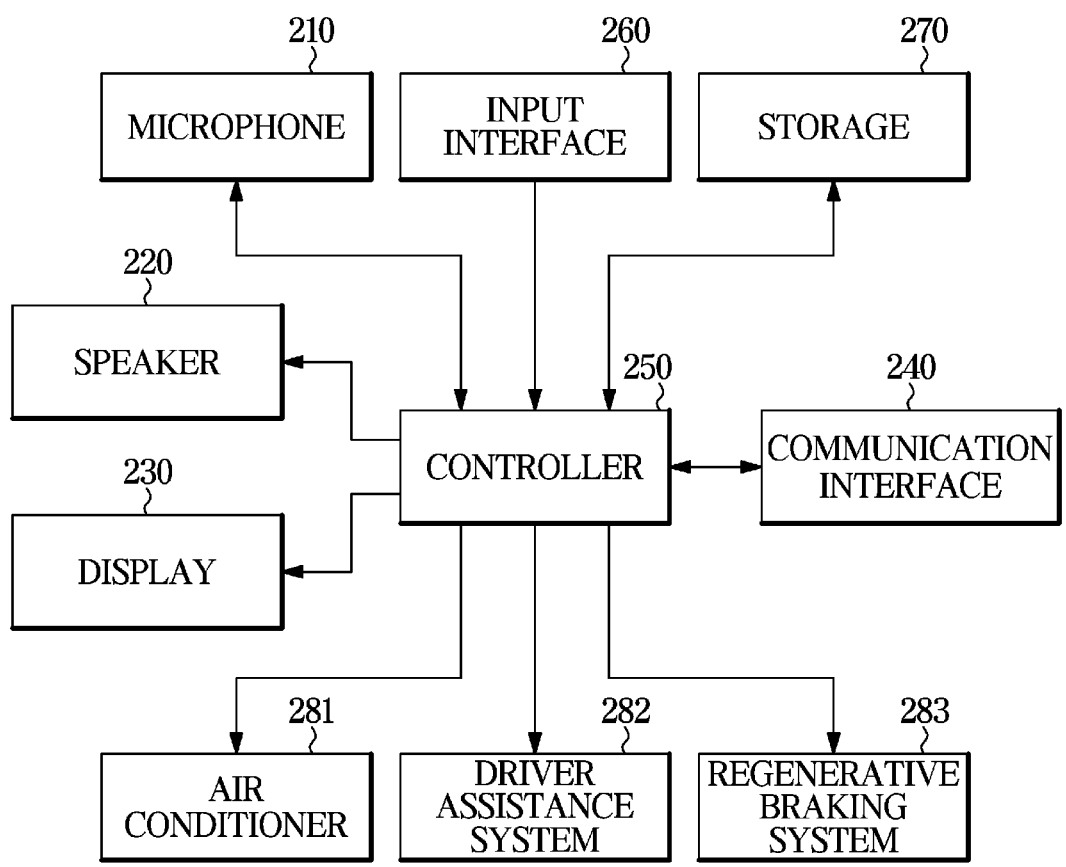
FIG. 5 is a block diagram illustrating a user terminal implemented as a vehicle.
Figure 6:
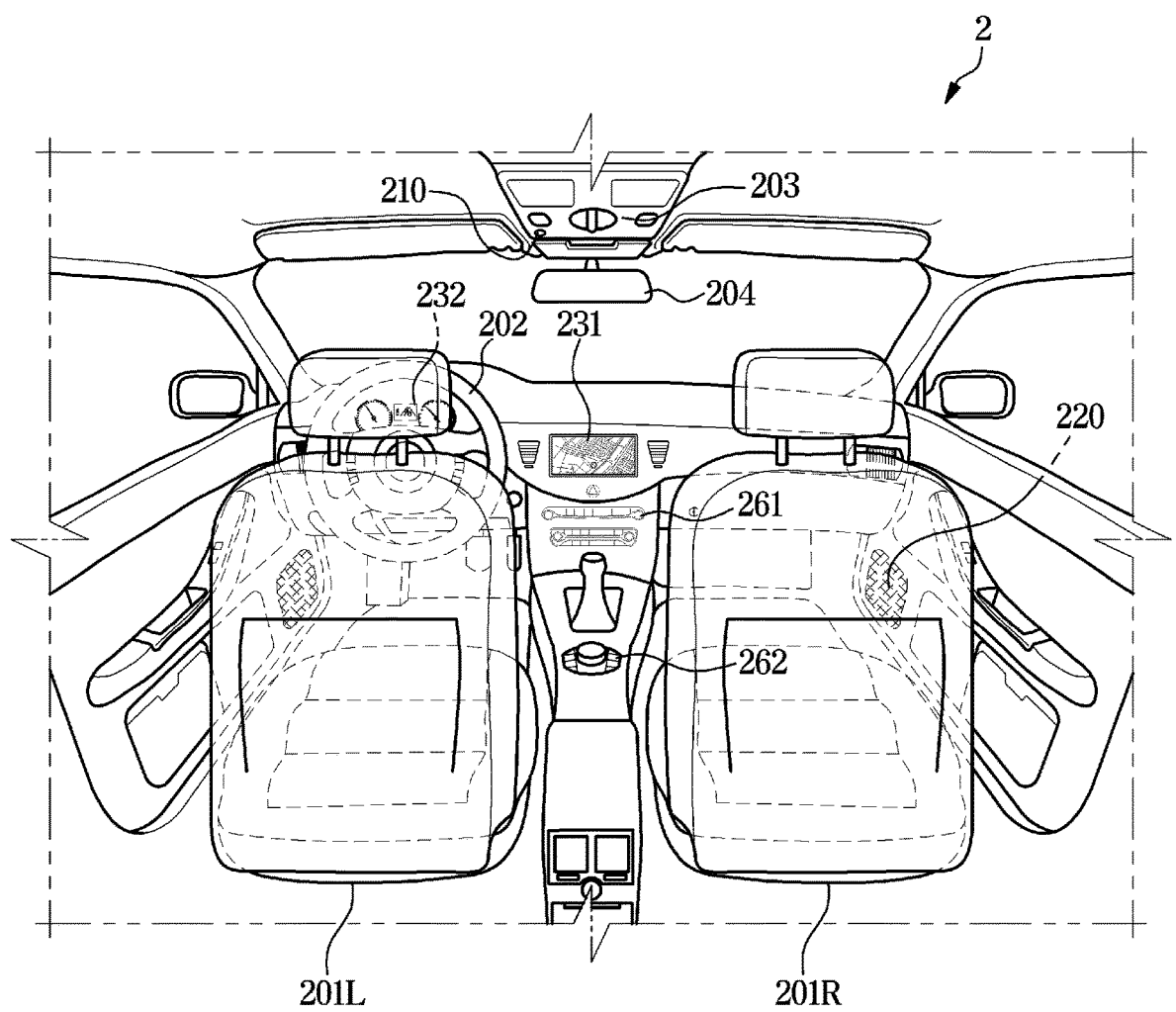
FIG. 6 is a diagram illustrating an internal configuration when a user terminal is implemented as a vehicle.

FIG. 5 is a block diagram illustrating a user terminal implemented as a vehicle. FIG. 6 is a diagram illustrating an internal configuration if a user terminal is implemented as a vehicle.

Referring to FIGS. 5 and 6, if the user terminal 2 is implanted as a vehicle, a user may be a driver or an occupant (e.g., a passenger). In this case, the microphone 210 may be provided on a steering wheel 202, a center fascia, a headliner 203, or a rear-view mirror 204, etc., to receive a voice command from the driver or a front-seat passenger.

Also, two or more microphones 210 may be provided. In this case, a first microphone may be provided to receive a driver's voice command, and a second microphone may be provided to receive a rear-seat passenger's voice command, for example, be provided on at least one of a rear armrest, rear doors, B pillar or C pillar, or headliner of the vehicle.

The display 230 may include an audio, video, and navigation (AVN) display 231 provided on a center fascia of a vehicle, and a cluster display 232. Also, the display 230 may further include a head-up display (HUD).

Alternatively, the display 230 may include a rear seat display provided on a back of a headrest of each front seat 201L and 201R so that a rear occupant may see the rear seat display. If the vehicle is a multi-seater vehicle, the display 230 may include a display mounted on a headliner of the vehicle.

The display 230 may be provided anywhere as long as users inside the vehicle may see the display 230, and the position or the number of displays 230 are not limited.

Also, the input interface 260 may include a button 261 provided on an AVN area in a center fascia, and jog shuttle 262 in an area where a gearbox is provided. Alternatively, the input interface 260 may include a paddle shift provided around a steering wheel, or a touchpad implementing a touchscreen provided integrally with the display 230.

In addition, to receive a control command related to passenger seats, the input interface 260 may include an input interface provided on each door of the vehicle, and an input interface provided on a front armrest or a rear armrest.

Further, if the user terminal 2 is a vehicle, an air conditioner 281 for adjusting an internal temperature of the vehicle, a driver assistance system 282 performing driving-related functions, and a regenerative braking system 283 may be further included.

The driver assistance system 282 is a system for assisting a driver's driving, and is capable of recognizing various situations that may occur during driving, outputting a warning, and automatically controlling constituent components of the vehicle.

The driver assistance system 282 may be provided in a vehicle, and be connected to various sensors detecting a surrounding environment or state of the vehicle, output a warning through the speaker 220 or the display 230 based on an output value transmitted from the sensors, and directly control related constituent components.

The regenerative braking system 283 is a system converting braking force generated if the vehicle decelerates into electric energy, and storing in a battery. If a vehicle is a hybrid vehicle, electric vehicle, or hydroelectric vehicle, the regenerative braking system 283 may be included in the vehicle.

For a detailed description, in the embodiment described below, an example where the user terminal 2 is a vehicle including the air conditioner 281, the driver assistance system 282, and the regenerative braking system 283 is described. However, because the vehicle, which is the user terminal 2, does not necessarily include the driver assistance system 282 and the regenerative braking system 283, the driver assistance system 282 and the regenerative braking system 283 may be omitted, or other vehicle-related systems may be included in the vehicle.

Figure 7:
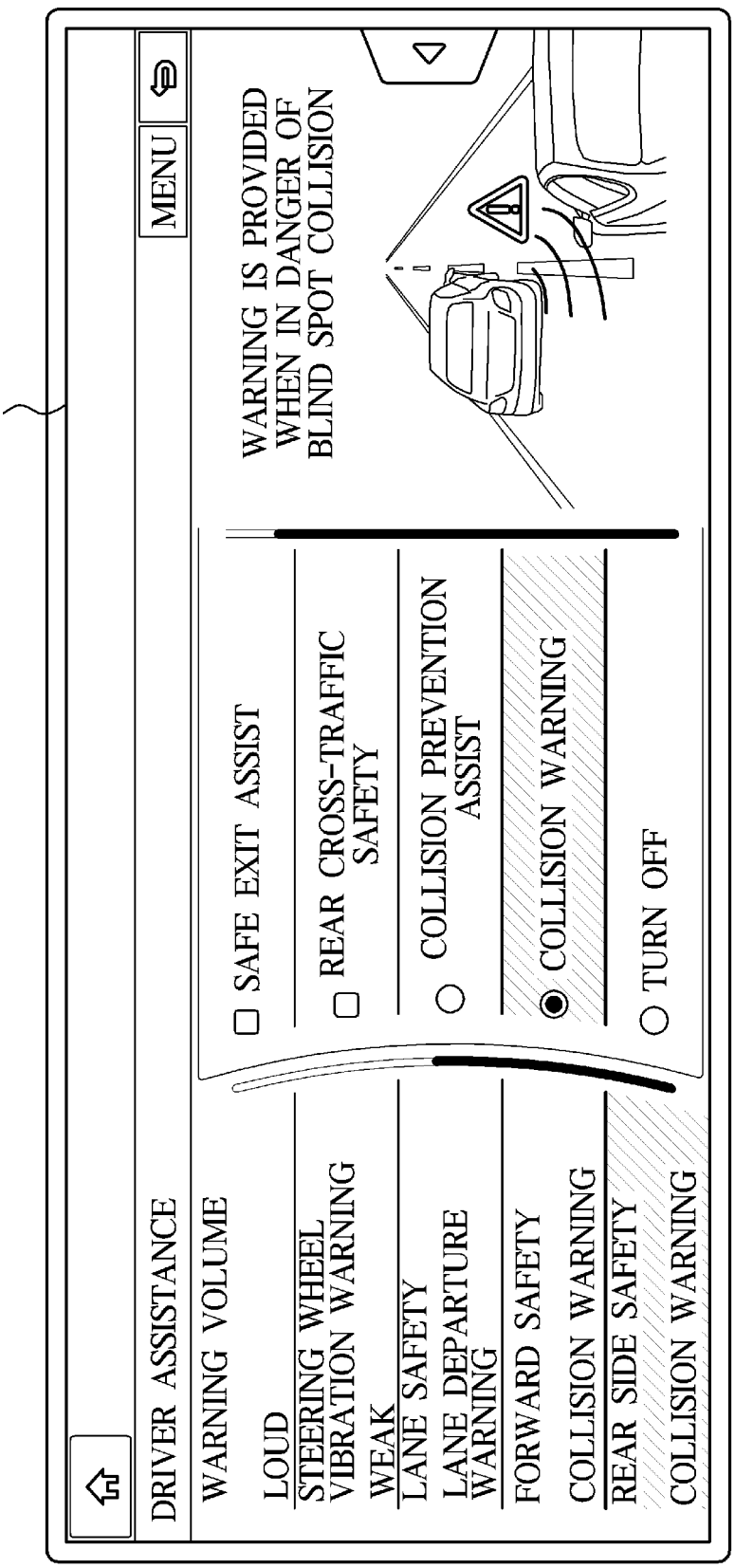
FIG. 7 is a diagram illustrating a screen for inputting settings related to a specific function of a user terminal.

FIG. 7 is a diagram illustrating a screen for inputting settings related to a specific function of a user terminal. In the embodiment described below, the user terminal 2 is referred to as the vehicle 2.

If a setting item related to a specific function of the vehicle 2 is manually input through the input interface 260, such an input process may generally involve a depth of two or more steps (e.g., levels).

Referring to an example of FIG. 7, in order to set a collision warning function for rear side safety among functions performed by the driver assistance system 282, through the input interface 260, a user may be required to select a driver assistance-related function, select a rear side safety function from various sub-items related to the driver assistance-related functions, and select the collision warning function from various sub-items related to the rear side safety function.

Also, an input for a portion of setting items may be guided through the AVN display 231, an input for another portion of the setting items may be guided through the cluster display 232, and an input for still another portion of the setting items may be guided through the HUD.

In addition, a setting value for a portion of setting items may be input through the button 261, a setting value for another portion of the setting items may be input through the jog shuttle 262, and a setting value for still another portion of the setting items may be input through a paddle shift.

As such, in the vehicle 2, the input interface 260 for inputting a setting value related to a specific function and the display 230 for guiding the input are dispersed, and a depth for inputting the setting value may be great, causing low usability and hindering an input of accurate setting values.

If a setting value for a predetermined setting item does not match a user's setting pattern (e.g., deviates from the user's historical usage pattern), the dialogue system 1 and a method of processing a dialogue may preemptively output a system speech for confirming an intention to change the setting value, thereby improving usability of the user terminal through an active use of the dialogue system.

Figure 8:
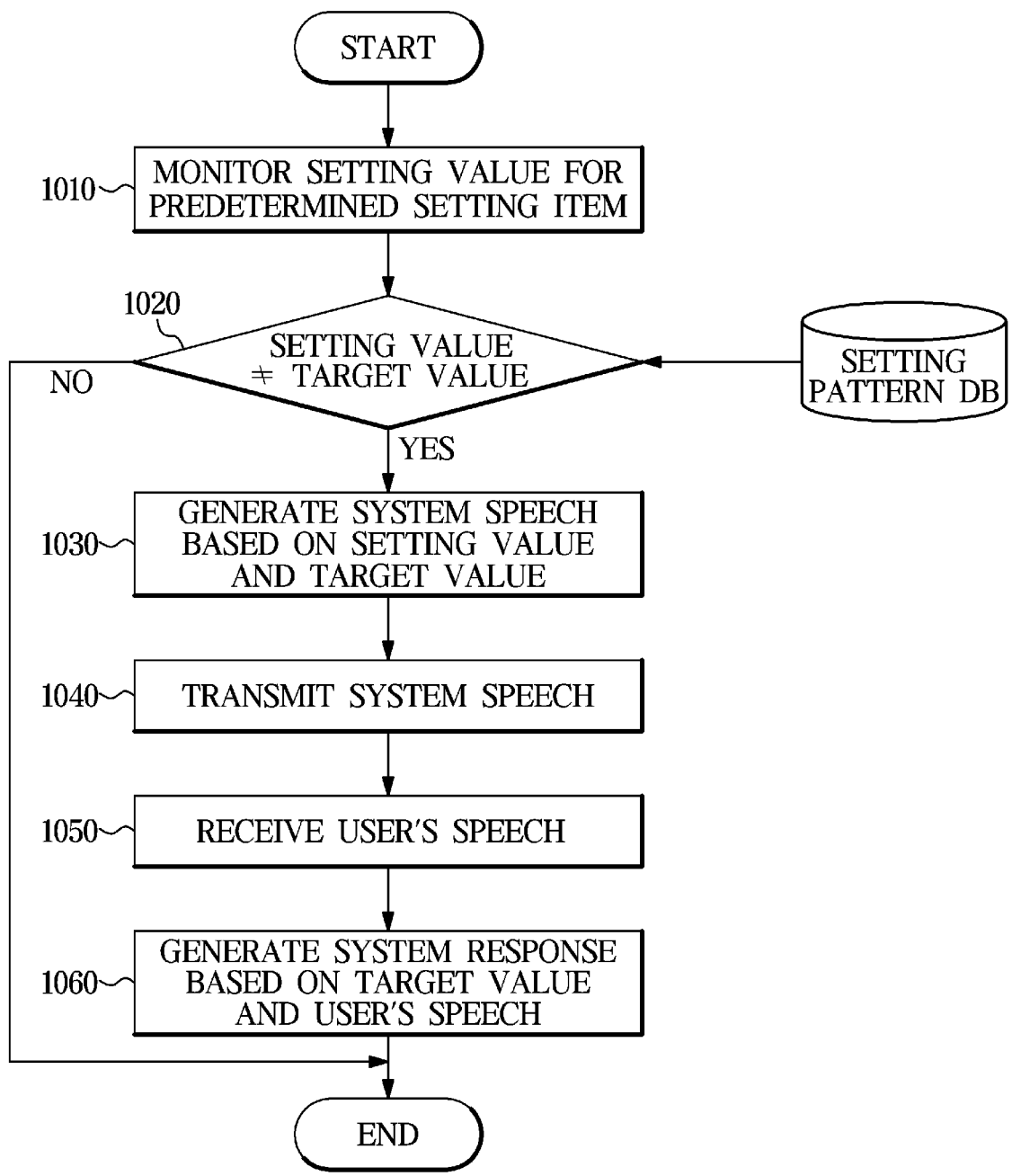
FIG. 8 is a flowchart illustrating a method of processing a dialogue.
Figure 9:
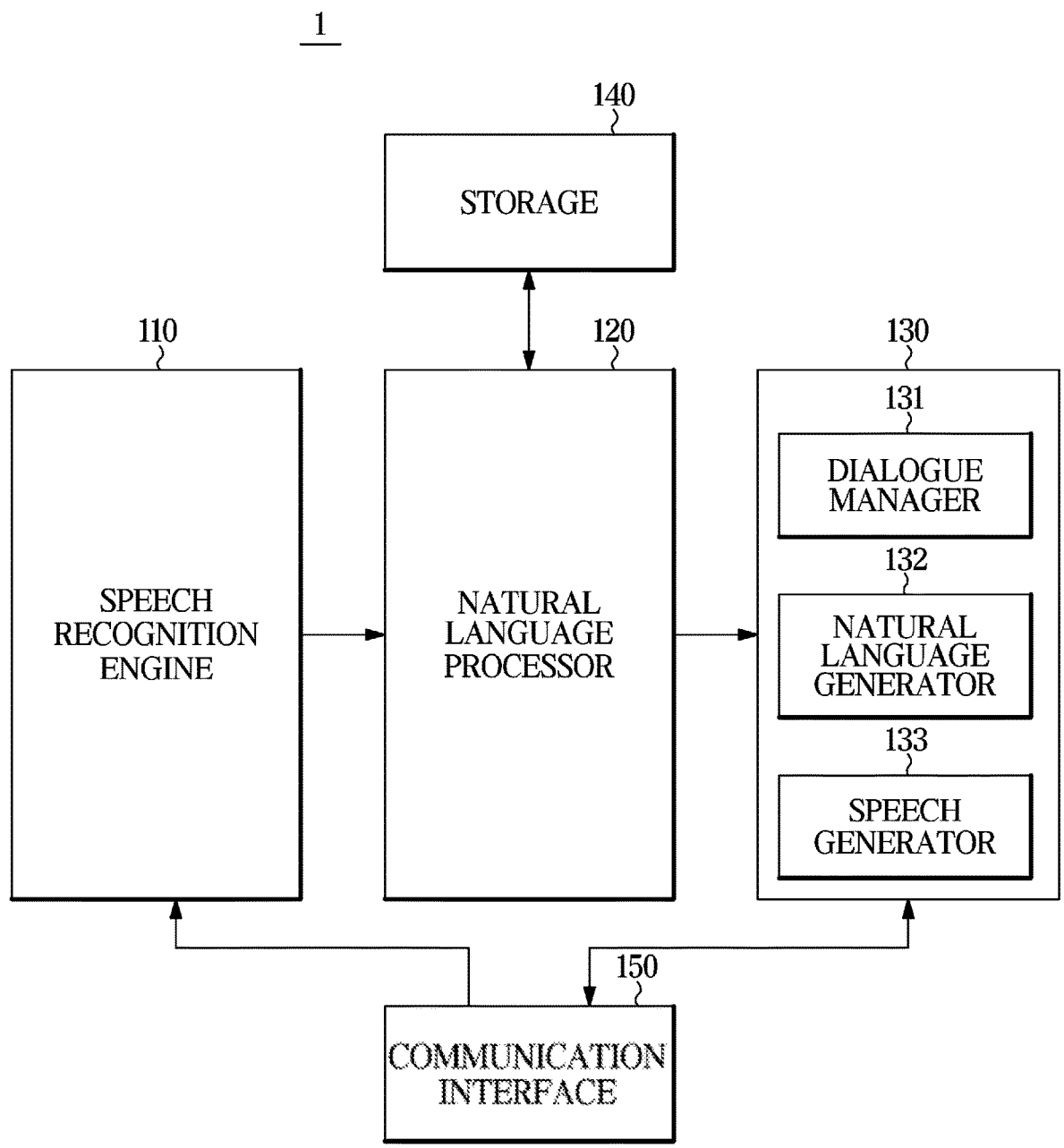
FIG. 9 is a block diagram illustrating operations of a control module of a dialogue system.

FIG. 8 is a flowchart illustrating a method of processing a dialogue. FIG. 9 is a block diagram illustrating operations of a controller of a dialogue system.

A method of processing a dialogue may be performed by the dialogue system 1 described above. Accordingly, the above description on the dialogue system 1 is applicable to embodiments of the method of processing a dialogue, even when not specifically described below. Also, a description on the method of processing a dialogue may be equally applied to the dialogue system 1, even when not specifically described below.

Referring to FIG. 8, the controller 130 monitors a setting value for a predetermined setting item (1010).

The predetermined setting item is an item where a setting value related to a function performable in the vehicle 2 may be input, and may refer to an item in which candidate values of a setting value are plural.

Also, the predetermined setting item may refer to an item settable by a manual input having a plurality of steps (e.g., multiple layers of menu for the settings), if input through the input interface 260.

Also, the predetermined setting item may refer to an item whose setting values are comparable based on magnitude, intensity, or degree thereof.

Because the predetermined setting item is not required to satisfy all of the above-described conditions, even when one of the above-described conditions is satisfied, the predetermined setting item may be encompassed by a scope of the disclosure.

For example, the predetermined setting item may include a set temperature of the air conditioner 281 for adjusting an internal temperature of the vehicle 2.

Alternatively, the predetermined setting item may include at least one of a speed (e.g., fast/normal/slow) of responsiveness of smart cruise control provided in the driver assistance system 282, warning timing (e.g., normal/slow), warning volume (e.g., loud/medium/quiet/off), intensity of steering wheel vibration warning (e.g., strong/medium/weak/off), types of function related to forward safety or rear side safety (e.g., collision prevention assist/collision warning/off), types of lane safety-related function (e.g., active lane departure avoidance assist/lane departure avoidance assist/lane departure warning/off), or types of parking safety-related function (e.g., collision prevention assist/collision warning/off).

Alternatively, the predetermined setting item may include the amount of regenerative braking energy generated by the regenerative braking system 283 (e.g., level 1/level 2/level 3/level 4/level 5).

For monitoring, the vehicle 2 may transmit the setting value for the predetermined setting item to the dialogue system 1. For example, when the setting value for the predetermined setting item is changed, the changed setting value may be transmitted to the dialogue system 1. If the setting value is input through the input interface 260, the vehicle 2 may transmit the input setting value to the dialogue system 1.

Alternatively, if a default setting value is applied during execution of a function corresponding to the predetermined setting item in the vehicle 2, the corresponding setting value may be transmitted to the dialogue system 1.

Alternatively, if a function corresponding to the predetermined setting item is executed in the vehicle 2, the setting value for the predetermined setting item may be transmitted to the dialogue system 1 periodically or in real time.

Monitoring the setting value for the predetermined setting item may include comparing the setting value for the predetermined setting item to a target value. Accordingly, if the setting value for the predetermined setting item is received from the vehicle 2, the controller 130 of the dialogue system 1 may compare the received setting value to the target value for the predetermined setting item.

The storage 140 of the dialogue system 1 may store a setting pattern for the predetermined setting item. The setting pattern may be stored for each vehicle 2, or for each user.

For example, if the vehicle 2 accesses the dialogue system 1 without a separate user registration, the setting pattern may be stored for each vehicle identification number (VIN), and if a plurality of users use a single vehicle 2 or the vehicle 2 accesses the dialogue system 1 through a separate user registration, the setting pattern may be stored for each user.

Also, the setting pattern may be stored according to at least one of a time period, season, location or occupant information. For example, the setting pattern for the predetermined setting item may be stored by dividing a time period into morning/afternoon, into office-going hour/quitting hour, or into weekdays/weekends.

As another example, the setting pattern for the predetermined setting item may be stored by dividing seasons into spring/summer/fall/winter.

As still another example, the setting pattern for the predetermined setting item may be stored by dividing locations into near my house/near my office/school zone/near my child's language school.

As yet another example, the setting pattern for the predetermined setting item may be stored by dividing occupant information into a driver-only on board/driver and front occupant on board/driver and rear occupant on board/driver and car seat occupant on board.

The controller 130 may search the storage 140 for a setting pattern matching a current time period, season, location or occupant information, determine a target value among the retrieved setting pattern, and compare the determined target value to a current setting value.

The setting pattern for the predetermined setting item may be expressed as a frequency of setting value shown in a usage history. For example, if the predetermined setting item is a set temperature of an air conditioner, a frequency of use for each set temperature may be included in the setting pattern. As another example, if the predetermined setting item is the amount of regenerative braking of a regenerative braking system, a frequency of use for each braking level indicating the amount of braking may be included in the setting pattern.

The target value for the predetermined setting item may be determined according to the setting pattern. For example, a setting value having the highest frequency of use among frequencies shown in the setting pattern may be the target value for the predetermined setting item.

If the current setting value and the target value do not match (Yes in operation 1020), the controller 130 generates a system speech based on the setting value and the target value (1030).

Meanwhile, monitoring the setting values described above may be performed by the vehicle 2. In this case, a setting pattern for the corresponding vehicle 2 may be stored in a storage 270 of the vehicle 2. If the vehicle monitors the setting value for the predetermined setting item and the setting value and the target value do not match, a trigger signal for generating a system speech may be transmitted to the dialogue system 1.

Referring to FIG. 9, the controller 130 of the dialogue system 1 may include a dialogue management module 131, a natural language generation module 132 and a speech generation module 133.

The dialogue management module 131 may manage a flow of dialogues between a user and the dialogue system 1. For example, the dialogue management module 131 may include a dialogue state tracker and a policy manager.

The dialogue state tracker may track a current dialogue state. The dialogue state tracker may update a dialogue state based on an analysis result of the natural language processor 120 or a comparison result of the target value and the setting value for the predetermined setting item.

The policy manager may determine a task to be performed by a system according to dialogue policies. For example, if the target value and the setting value for the predetermined setting item do not match, the policy manager may determine, as a task, generation of a system speech for confirming whether a user has an intention to change the setting value.

The natural language generation module 132 may generate a system speech to be provided to a user, as text, based on information provided from the dialogue management module 131. In the embodiment, the natural language generation module 132 may generate the system speech based on the target value and the setting value for the predetermined setting item, for example, a comparison result of the target value and the setting value.

Specifically, if a current setting value is less than a target value, a system speech for confirming whether to increase the setting value may be generated. If a current setting value is greater than a target value, a system speech for confirming whether to decrease the setting value may be generated.

The speech generation module 133 may convert the system speech in text form into an audio signal using a text to speech (TTS) engine.

The communication interface 150 of the dialogue system 1 transmits the generated system speech to the vehicle 2 (1040).

The vehicle 2 receiving the system speech may output the system speech through the speaker 220. A user's speech in response to the output system speech may be input to the microphone 210, and the vehicle 2 may transit the input user's speech to the dialogue system 1.

The communication interface 150 of the dialogue system 1 may receive the user's speech from the vehicle 2 (1050).

The speech recognition engine 110 of the dialogue system 1 may convert the user's speech into text, and the natural language processor 120 may perform analysis such as classification of intent corresponding to the user's speech based on the converted text.

The controller 130 may generate a system response based on the user's speech and the target value (1060).

If the intent corresponding to the user's speech is to change the setting value for the predetermined setting item to the target value, the controller 130 may generate a control signal for changing the setting value for the predetermined setting item to the target value, and generate a system speech for guiding change of the setting value.

Alternatively, if the intent corresponding to the user's speech is to change the setting value for the predetermined setting item to a value opposite to the target value, the controller 130 may generate a control signal for changing the setting value for the predetermined setting item to the value opposite to the target value, and generate a system speech for guiding change of the setting value.

For example, if a current setting value is less than a target value, a value having the highest frequency of use among values smaller than the current setting value within a setting pattern may be a value opposite to the target value. If a current setting value is greater than a target value, a value having the highest frequency of use among values greater than the current setting value within a setting pattern may be a value opposite to the target value.

Alternatively, if the intent corresponding to the user's speech is to maintain the setting value for the predetermined setting item, the controller 130 may generate a system speech for guiding maintenance of the setting value.

The generated system response may be transmitted to the vehicle 2, and the vehicle 2 may output the system speech through the speaker 220 according to the transmitted system response, or the controller 250 may control constituent components of the vehicle 2.

Figure 10:
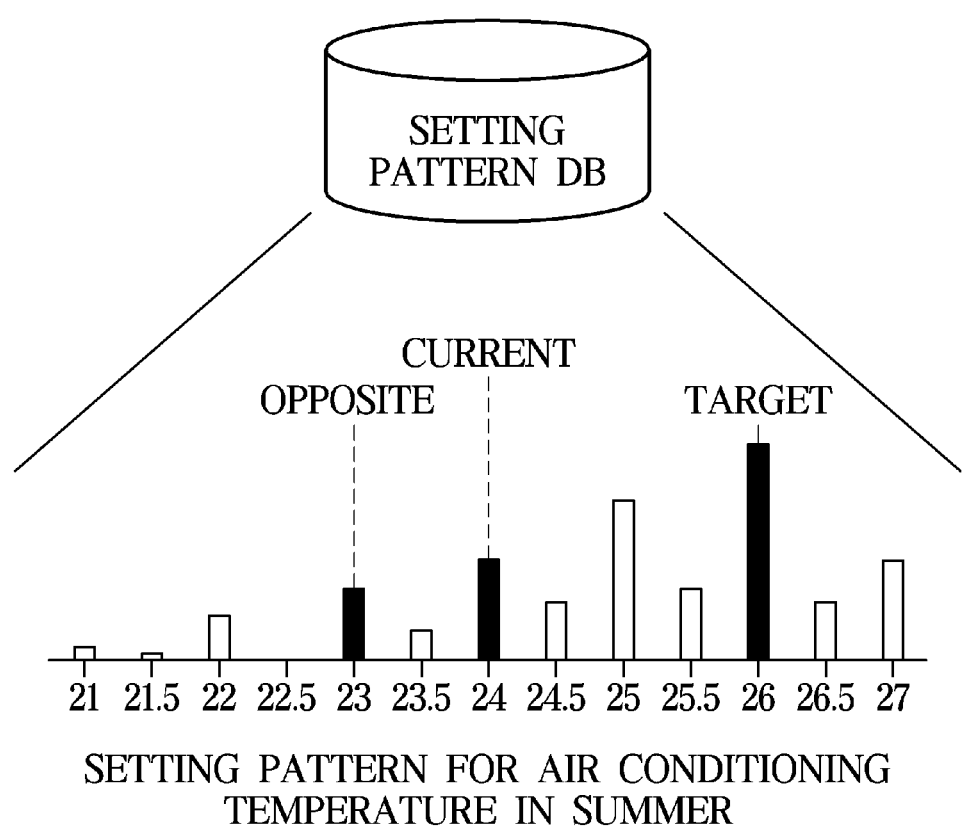
FIG. 10 is a diagram illustrating an example of a setting pattern stored in a dialogue system.
Figure 12:
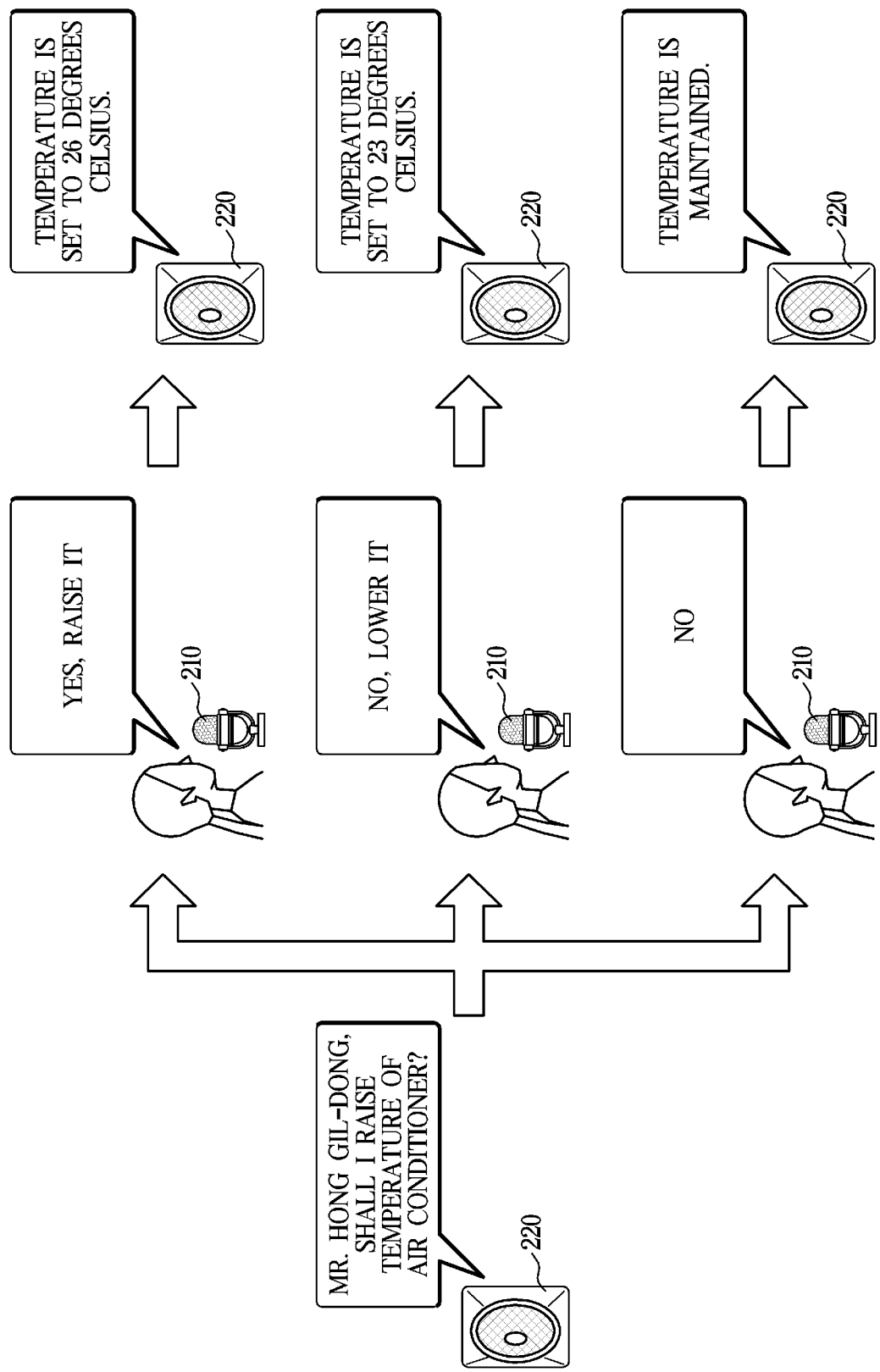
FIG. 12 is a diagram illustrating an example of dialogues between a user and a dialogue system.

FIG. 10 is a diagram illustrating an example of a setting pattern stored in a dialogue system. FIG. 11 is a diagram illustrating an example of an operation of generating a system speech by a dialogue system. FIG. 12 is a diagram illustrating an example of dialogues between a user and a dialogue system.

As described above, a predetermined setting item may include a set temperature of the air conditioner 281, and a setting pattern for the predetermined setting item may be stored for each season.

Accordingly, like in an example of FIG. 10, a setting pattern (e.g., a historical pattern of setting values being set by a user) of air conditioner temperature in summer may be stored in a setting pattern database (DB) of the storage 140. If the stored setting pattern is the same as the example of FIG. 10, a target value in the setting pattern may be 26 degrees Celsius having the highest frequency of use, and an opposite value may be 23 degrees Celsius having the highest frequency of use among values smaller than a current setting value.

As a result of monitoring the setting value for the set temperature of the air conditioner 281 by the controller 130, if a current temperature is 24 degrees Celsius, it may be determined that the current setting value (24 degrees Celsius) and the target value (26 degrees Celsius) do not match.

Accordingly, the controller 130 may generate a system speech to be preemptively output before a user's speech is received, based on the setting value and the target value. As described above, a setting pattern for a predetermined setting item may be stored for each user. Referring to an example of FIG. 11, the system speech may consist of a suggestion based on a user, related function, setting target, current setting value, and target value.

If a user's name is 'HONG GIL-DONG', 'Mr. HONG GIL-DONG' may be included in the system speech. Because a related function is the air conditioner 281, "air conditioner" may be included in the system speech, and because a setting target is a temperature, "temperature" may be included in the system speech. In this instance, the system speech may be generated by changing a name of a function corresponding to the predetermined setting item to a term familiar to users (e.g., a commonly used term).

Because the current setting value is 24 degrees Celsius and the target value is 26 degrees Celsius, the current setting value is lower than the target value. Accordingly, the system speech may include a suggestion for confirming an intention to increase the setting value (e.g., "shall I raise . . . ").

The generated system speech may be transmitted to the vehicle 2. As shown in FIG. 12, a system speech, "Mr. HONG GIL-DONG, shall I raise the temperature of air conditioner?", may be output through the speaker 220.

In response to the system speech, the user may input a user's speech, "Yes, raise the temperature," to the microphone 210. The input user's speech may be transmitted to the dialogue system 1. If an analysis result is obtained through the speech recognition engine 110 and the natural language processor 120, the controller 130 may generate a control signal for increasing the set temperature of the air conditioner 281 to the target value which is 26 degrees Celsius, and generate a system speech for guiding the change, "the temperature is set to 26 degrees Celsius".

Even though neither the system speech nor the user's speech includes quantitative information about the setting value, the controller 130 already has information about a setting value (e.g., target value) estimated to be intended by the user, based on the user's setting pattern. Accordingly, even when non-quantitative user's speech is input, the controller 130 may generate a quantitative system response.

The system response including the control signal and the system speech may be transmitted to the vehicle 2, and the vehicle 2 may output the system speech through the speaker 220 and raise the set temperature of the air conditioner 281 to 26 degrees Celsius according to the control signal. In this instance, as the set temperature is increased to 26 degrees Celsius, the setting pattern in the storage 140 may be updated.

Alternatively, in response to the preemptively output system speech, a user's speech, "No, lower the temperature", may be input to the microphone 210. The input user's speech may be transmitted to the dialogue system 1. If an analysis result is obtained through the speech recognition engine 110 and the natural language processor 120, the controller 130 may generate a control signal for decreasing the set temperature of the air conditioner 281 to an opposite value which is 23 degrees Celsius, and generate a system speech for guiding the change, "the temperature is set to 23 degrees Celsius".

A system response including the control signal and the system speech may be transmitted to the vehicle 2, and the vehicle 2 may output the system speech through the speaker 220 and lower the set temperature of the air conditioner 281 to 23 degrees Celsius according to the control signal. In this instance, as the set temperature is decreased to 23 degrees Celsius, the setting pattern in the storage 140 may be updated.

Alternatively, in response to the preemptively output system speech, a user's speech, "No," may be input to the microphone 210. The input user's speech may be transmitted to the dialogue system 1. If an analysis result is obtained through the speech recognition engine 110 and the natural language processor 120, the controller 130 may generate a system speech for informing that the set temperature of the air conditioner 281 is maintained (e.g., "The temperature is maintained.").

Figure 13:
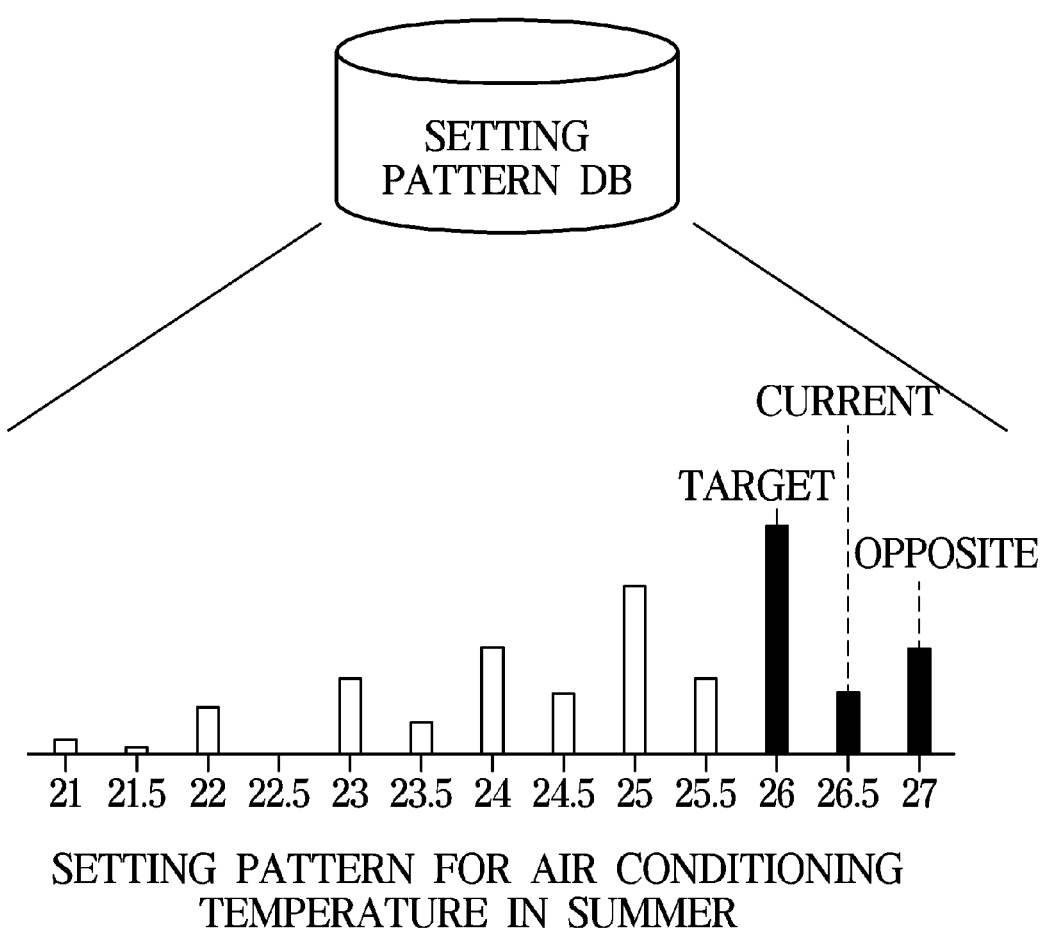
FIG. 13 is a diagram illustrating an example of a setting pattern stored in a dialogue system.
Figure 15:
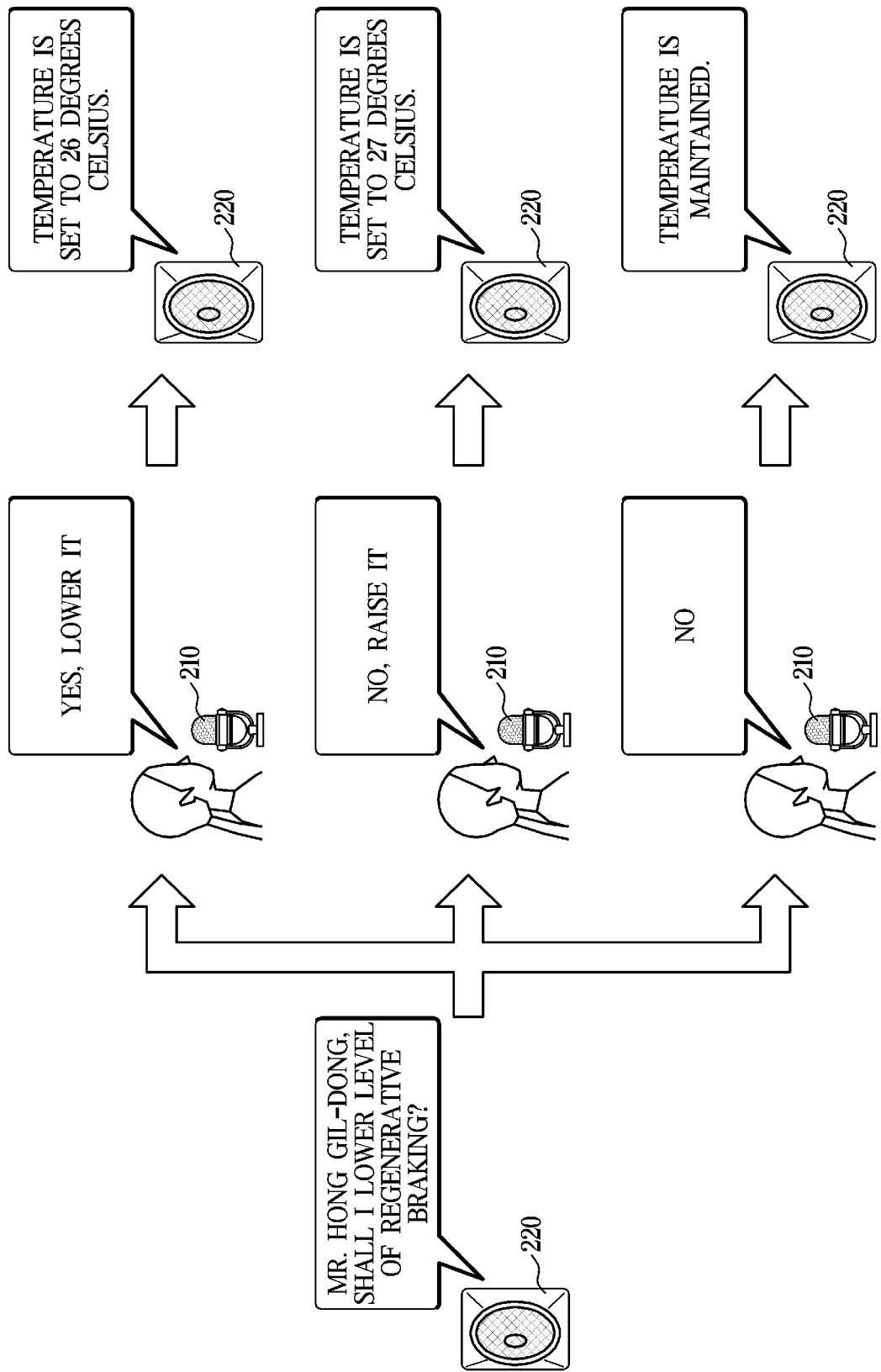
FIG. 15 is a diagram illustrating another example of dialogues between a user and a dialogue system.

FIG. 13 is a diagram illustrating an example of a setting pattern stored in a dialogue system. FIG. 14 is a diagram illustrating another example of an operation of generating a system speech by a dialogue system. FIG. 15 is a diagram illustrating another example of dialogues between a user and a dialogue system.

Referring to FIG. 13, a target value in a setting pattern may be 26 degrees Celsius having the highest frequency of use, and if a current setting value is 26.5 degrees Celsius, an opposite value may be 27 degrees Celsius having the highest frequency of use among values greater than the current setting value.

As a result of monitoring the setting value for a set temperature of the air conditioner 281 by the controller 130, because a current temperature is 26.5 degrees Celsius, it may be determined that the current setting value (26.5 degrees Celsius) and the target value (26 degrees Celsius) do not match. Accordingly, the controller 130 may generate a system speech to be preemptively output before a user's speech, based on the setting value and the target value.

As shown in FIG. 14, if a user's name is "HONG GIL-DONG," "Mr. HONG GIL-DONG" may be included in the system speech. Because a related function is the air conditioner 281, "air conditioner" may be included in the system speech, and because a setting target is a temperature, 'temperature' may be included in the system speech.

Because the current setting value is 26.5 degrees Celsius and the target value is 26 degrees Celsius, the current setting value is higher than the target value. Accordingly, the system speech may include a suggestion for confirming an intention to decrease the setting value (e.g., "shall I lower").

The generated system speech may be transmitted to the vehicle 2. As shown in FIG. 15, a system speech, "Mr. HONG GIL-DONG, shall I lower the temperature of air conditioner?", may be output through the speaker 220.

In response to the system speech, the user may input a user's speech, "Yes, lower the temperature," to the microphone 210. The input user's speech may be transmitted to the dialogue system 1. If an analysis result is obtained through the speech recognition engine 110 and the natural language processor 120, the controller 130 may generate a control signal for decreasing the set temperature of the air conditioner 281 to the target value which is 26 degrees Celsius, and generate a system speech for guiding the change, "the temperature is set to 26 degrees Celsius."

A system response including the control signal and the system speech may be transmitted to the vehicle 2, and the vehicle 2 may output the system speech through the speaker 220 and lower the set temperature of the air conditioner 281 to 26 degrees Celsius according to the control signal. In this instance, as the set temperature is decreased to 26 degrees Celsius, the setting pattern in the storage 140 may be updated.

Alternatively, in response to the preemptively output system speech, a user's speech, "No, raise the temperature", may be input to the microphone 210. The input user's speech may be transmitted to the dialogue system 1. If an analysis result is obtained through the speech recognition engine 110 and the natural language processor 120, the controller 130 may generate a control signal for increasing the set temperature of the air conditioner 281 to an opposite value which is 27 degrees Celsius, and generate a system speech for guiding the change, "The temperature is set to 27 degrees Celsius."

A system response including the control signal and the system speech may be transmitted to the vehicle 2, and the vehicle 2 may output the system speech through the speaker 220 and raise the set temperature of the air conditioner 281 to 27 degrees Celsius according to the control signal. In this instance, as the set temperature is increased to 27 degrees Celsius, the setting pattern in the storage 140 may be updated.

Alternatively, in response to the preemptively output system speech, a user's speech, "No," may be input to the microphone 210. The input user's speech may be transmitted to the dialogue system 1. If an analysis result is obtained through the speech recognition engine 110 and the natural language processor 120, the controller 130 may generate a system speech for informing that the set temperature of the air conditioner 281 is maintained (e.g., "The temperature is maintained.").

Figure 16:
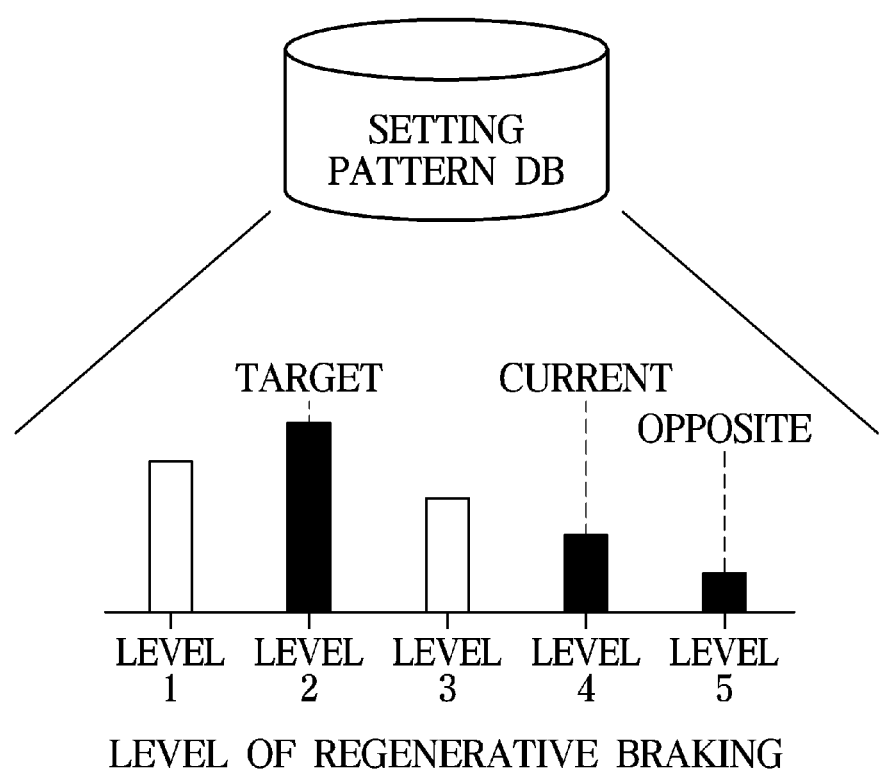
FIG. 16 is a diagram illustrating another example of a setting pattern stored in a dialogue system.
Figure 18:
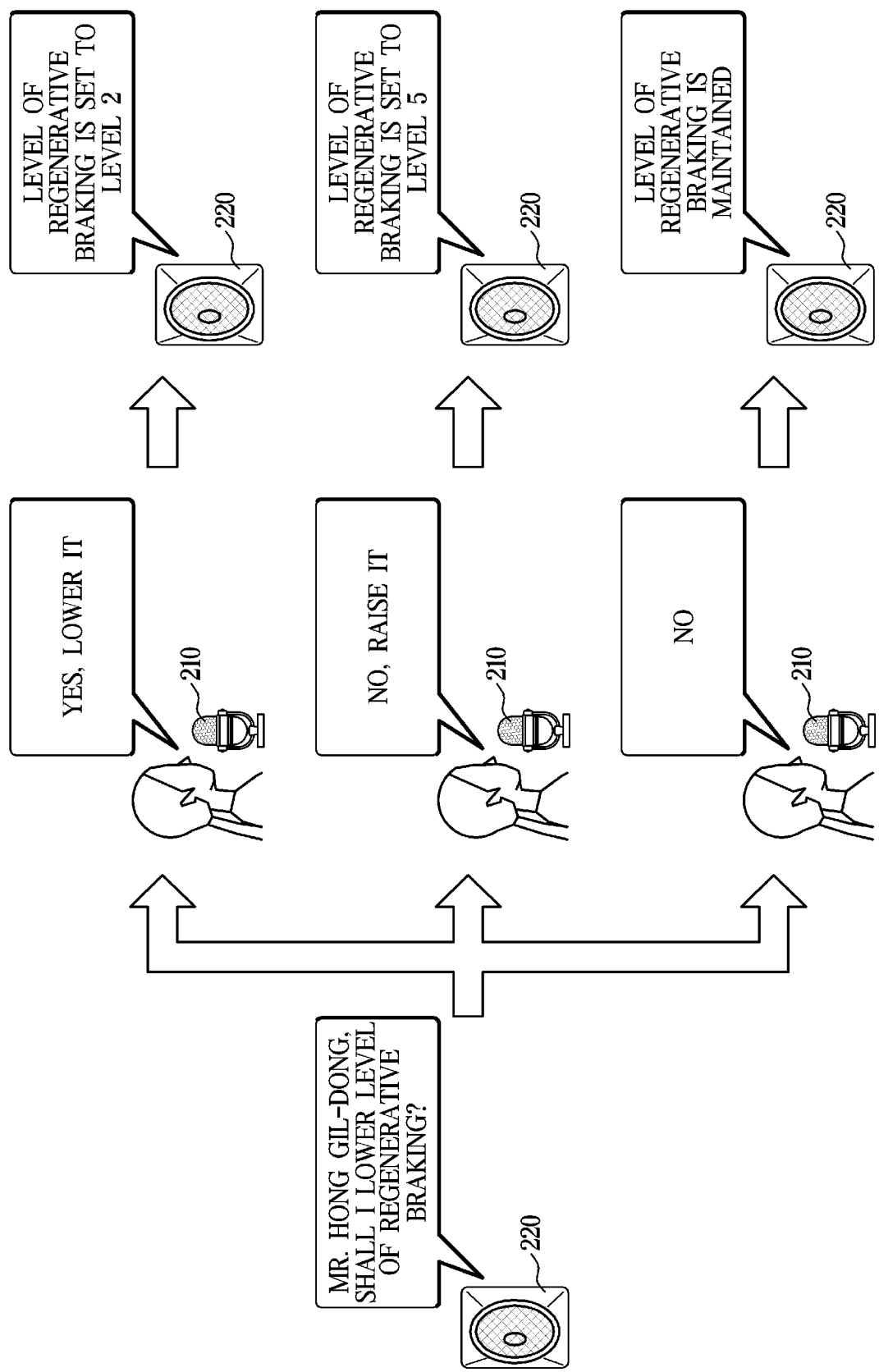
FIG. 18 is a diagram illustrating an example of dialogues between a user and a dialogue system.

FIG. 16 is a diagram illustrating another example of a setting pattern stored in a dialogue system. FIG. 17 is a diagram illustrating an example of an operation of generating a system speech by a dialogue system. FIG. 18 is a diagram illustrating an example of dialogues between a user and a dialogue system.

As described above, a predetermined setting item may include a regenerative braking level of the regenerative braking system 283. Accordingly, like an example of FIG. 16, a setting pattern of the regenerative braking level may be stored in a setting pattern DB of the storage 140.

If the stored setting pattern is the same as the example of FIG. 16, a target value in the setting pattern may be level 2 having the highest frequency of use, and if a current setting value is level 4, an opposite value may be level 5 having the highest frequency of use among values greater than the current setting value.

As a result of monitoring the setting value for the regenerative braking level of the regenerative braking system 283 by the controller 130, because a current regenerative braking level is level 4, it may be determined that the current setting value (e.g., level 4) and the target value (e.g., level 2) do not match. Accordingly, the controller 130 may generate a system speech to be preemptively output before a user's speech, based on the setting value and the target value.

As shown in FIG. 17, if a user's name is "HONG GIL-DONG," "Mr. HONG GIL-DONG" may be included in the system speech. Because a related function is the regenerative braking system 283, "regenerative braking" may be included in the system speech, and because a setting target is the amount of regenerative braking, 'level' may be included in the system speech.

Because the current setting value is level 4 and the target value is level 2, the current setting value is higher than the target value. Accordingly, the system speech may include a suggestion for confirming an intention to decrease the setting value, (e.g., "Shall I lower . . . ").

The generated system speech may be transmitted to the vehicle 2. As shown in FIG. 18, a system speech, "Mr. HONG GIL-DONG, shall I lower the level of regenerative braking?", may be output through the speaker 220 of the vehicle 2.

In response to the system speech, the user may input a user's speech, "Yes, lower the level of regenerative braking," to the microphone 210. The input user's speech may be transmitted to the dialogue system 1. If an analysis result is obtained through the speech recognition engine 110 and the natural language processor 120, the controller 130 may generate a control signal for lowering the regenerative braking level of the regenerative braking system 283 to the target value which is level 2, and generate a system speech for guiding the change, "the level of regenerative braking is set to level 2."

A system response including the control signal and the system speech may be transmitted to the vehicle 2, and the vehicle 2 may output the system speech through the speaker 220 and lower the regenerative braking level of the regenerative braking system 283 according to the control signal. In this instance, as level of regenerative braking is lowered, the setting pattern in the storage 140 may be updated.

Alternatively, in response to the preemptively output system speech, a user's speech, "no, raise the level of regenerative braking", may be input to the microphone 210. The input user's speech may be transmitted to the dialogue system 1. If an analysis result is obtained through the speech recognition engine 110 and the natural language processor 120, the controller 130 may generate a control signal for increasing the regenerative braking level of the regenerative braking system 283 to an opposite value which is level 5, and generate a system speech for guiding the change, "the level of regenerative braking is set to level 5".

A system response including the control signal and the system speech may be transmitted to the vehicle 2, and the vehicle 2 may output the system speech through the speaker 220 and raise the regenerative braking level of the regenerative braking system 283 to level 5 according to the control signal. In this instance, as the regenerative braking level is increased to level 5, the setting pattern in the storage 140 may be updated.

Alternatively, in response to the preemptively output system speech, a user's speech, "no", may be input to the microphone 210. The input user's speech may be transmitted to the dialogue system 1. If an analysis result is obtained through the speech recognition engine 110 and the natural language processor 120, the controller 130 may generate a system speech for informing that the regenerative braking level of the regenerative braking system 283 is maintained, e.g., "the level of regenerative braking is maintained".

Figure 19:
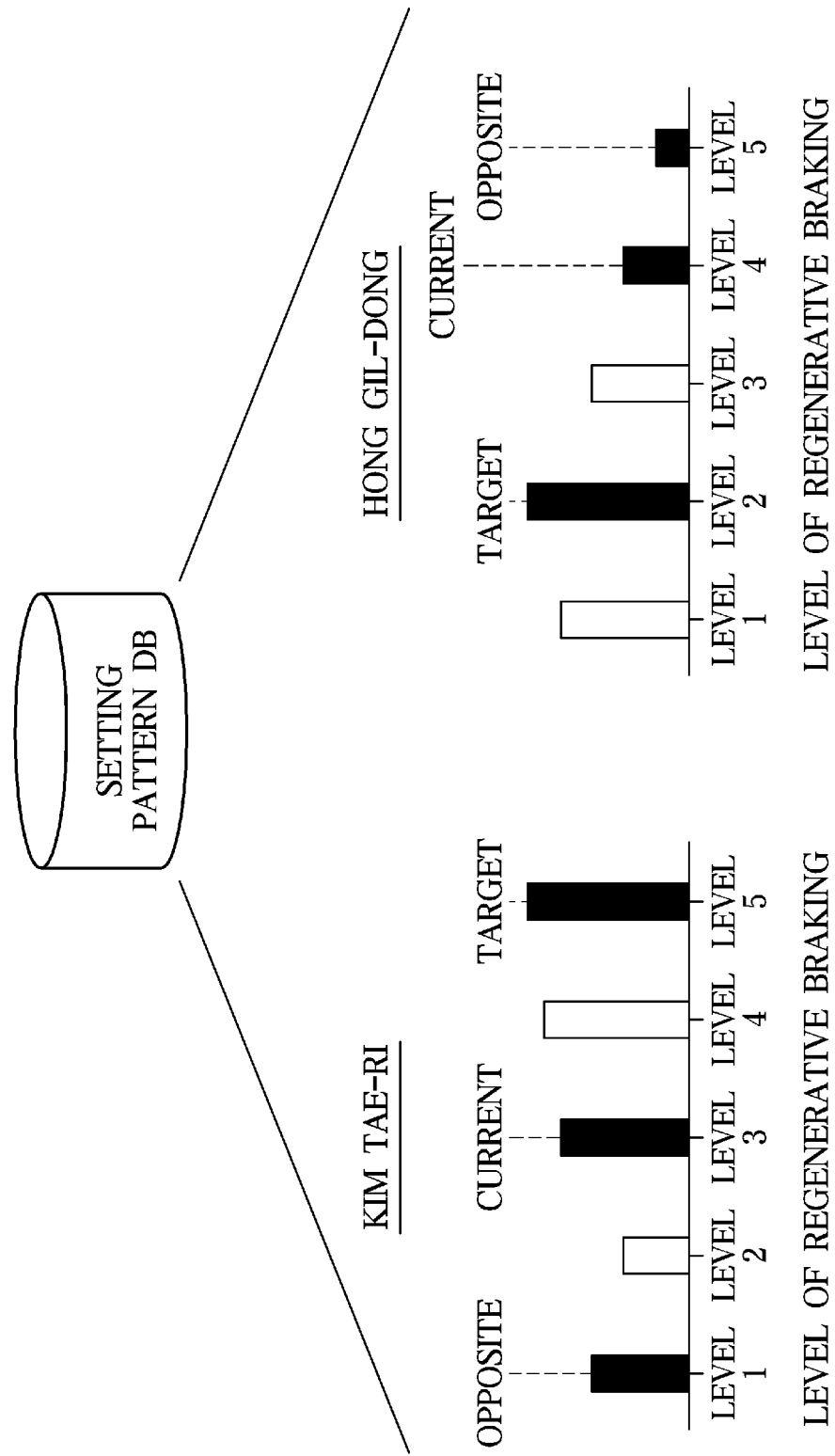
FIG. 19 is a diagram illustrating still another example of a setting pattern stored in a dialogue system.

FIG. 19 is a diagram illustrating still another example of a setting pattern stored in a dialogue system. FIG. 20 is a diagram illustrating an example of an operation of generating a system speech by a dialogue system. FIG. 21 is a diagram illustrating an example of dialogues between a user and a dialogue system.

As described above, a setting pattern for a predetermined setting item may be stored for each user. In particular, if a plurality of users use the vehicle 2 and one of the plurality of users inputs personal identification information through the input interface 260 after getting in the vehicle 2, the controller 130 may identify the user based on the input identification information.

Alternatively, user identification may be performed through face recognition using a camera provided in the vehicle 2, or through voice recognition using the microphone 210.

If the user is identified, the controller 130 may obtain setting pattern information about the identified user from the storage 140, and monitor a setting value for a predetermined setting item based on the setting pattern information about the identified user.

In the example, an example where the user of the vehicle 2 is "KIM TAE-RI" is described. If the setting pattern stored with respect to "KIM TAE-RI" is the same as the example of FIG. 19, a target value in the setting pattern may be, for example, level having the highest frequency of use, and an opposite value may be level 1 having the highest frequency of use among values smaller than a current setting value (e.g., level 3).

As a result of monitoring a setting value for a regenerative braking level of the regenerative braking system 283 by the controller 130, because a current regenerative braking level is, for example, level 3, it may be determined that the current setting value (e.g., level 3) and the target value (e.g., level 5) do not match. Accordingly, the controller 130 may generate a system speech to be preemptively output before a user's speech based on the setting value and the target value.

As shown in FIG. 20, if a user's name is "KIM TAE-RI," "Ms. KIM TAE-RI" may be included in the system speech. Because a related function is the regenerative braking system 283, "regenerative braking" may be included in the system speech, and because a setting target is the amount of regenerative braking, 'level' may be included in the system speech.

Because the current setting value is level 3 and the target value is level 5, the current setting value is lower than the target value. Accordingly, the system speech may include a suggestion for confirming an intention to increase the setting value (e.g., "Shall I raise . . . ").

The generated system speech may be transmitted to the vehicle 2. As shown in FIG. 21, a system speech, "Ms. KIM TAE-RI, shall I raise the level of regenerative braking?", may be output through the speaker 220 of the vehicle 2.

In response to the system speech, the user may input a user's speech, "Yes, raise the level of regenerative braking," to the microphone 210. The input user's speech may be transmitted to the dialogue system 1. If an analysis result is obtained through the speech recognition engine 110 and the natural language processor 120, the controller 130 may generate a control signal for increasing the regenerative braking level of the regenerative braking system 283 to the target value which is level 5, and generate a system speech for guiding the change, "The level of regenerative braking is set to level 5."

A system response including the control signal and the system speech may be transmitted to the vehicle 2, and the vehicle 2 may output the system speech through the speaker 220 and raise the regenerative braking level of the regenerative braking system 283 according to the control signal. In this instance, as level of regenerative braking is raised, the setting pattern for the user "KIM TAE-RI" stored in the storage 140 may be updated.

Alternatively, in response to the preemptively output system speech, a user's speech, "No, lower the level of regenerative braking," may be input to the microphone 210. The input user's speech may be transmitted to the dialogue system 1. If an analysis result is obtained through the speech recognition engine 110 and the natural language processor 120, the controller 130 may generate a control signal for lowering the regenerative braking level of the regenerative braking system 283 to an opposite value which is level 1, and generate a system speech for guiding the change, "The level of regenerative braking is set to level 1."

A system response including the control signal and the system speech may be transmitted to the vehicle 2, and the vehicle 2 may output the system speech through the speaker 220 and lower the regenerative braking level of the regenerative braking system 283 to level 1 according to the control signal. In this instance, as the regenerative braking level is decreased to level 1, the setting pattern for the user "KIM TAE-RI" stored in the storage 140 may be updated.

Alternatively, in response to the preemptively output system speech, a user's speech, "No," may be input to the microphone 210. The input user's speech may be transmitted to the dialogue system 1. If an analysis result is obtained through the speech recognition engine 110 and the natural language processor 120, the controller 130 may generate a system speech for informing that the regenerative braking level of the regenerative braking system 283 is maintained (e.g., "The level of regenerative braking is maintained.").

The above system speeches are only an example that may be generated. Therefore, some information may be omitted or added in the above system speeches. Also, even when the same information is included, expression thereof may be different from the above-described examples.

For example, if users of the vehicle 2 are not distinguished or information about users of the vehicle 2 is non-existent, a user's name may not be included in a system speech.

Meanwhile, a current setting value may be a value set by default regardless of a user intention, or a user may not know what a current setting value is due to complicated manual operation method for inputting a setting value.

In preparation for the above cases, information about a current setting value may be further included in a system speech. For example, in the examples of FIGS. and 21, a system speech such as "Ms. KIM TAE-RI, a current level of regenerative braking is level 3. Shall I raise the level of regenerative braking?" may be generated.

Also, for a detailed description, an example where the user terminal 2 is a vehicle has been described. However, it is obvious to those skilled in the art that the above description is all equally applicable to other types of user terminal 2 other than a vehicle, except for a description applicable to a vehicle only.

Like the above-described embodiments, if a setting value for a predetermined setting item is different from a target value according to a setting pattern of a corresponding user, by preemptively outputting a system speech for confirming an intention to change the setting value, an opportunity to change to a setting value desired by the user may be provided, even when the corresponding value is set by default regardless of a user intention or the user is incapable of accurately inputting a setting value due to complicated manual input method for the corresponding setting.

Also, even when a user simply expresses only a user intention to increase or decrease a setting value in response to a preemptively output system speech, the user intention may be quantitatively analyzed based on an already known target value.

As is apparent from the above, according to the embodiments of the disclosure, if a setting value for a predetermined setting item is different from a user's setting pattern, the method of processing a dialogue, the dialogue system and the user terminal can preemptively output a system speech for confirming an intention to change a setting value, thereby improving usability of the user terminal through active use of the dialogue system.

Meanwhile, embodiments of the method of processing a dialogue can be stored in the form of a recording medium storing computer-executable instructions. The instructions may be stored in the form of a program code, and when executed by a processor, the instructions may perform operations of the disclosed embodiments. The recording medium may be implemented as a computer-readable non-transitory medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A method comprising:
   monitoring a setting value for a setting item of a vehicle;
   in response to the setting value not matching a target value for the setting item, generating a system speech based on the target value and the setting value;
   transmitting the generated system speech to a user terminal associated with the vehicle;
   detecting a user speech received via the user terminal; and
   in response to determining that content of the user speech indicates a modification of the target value, changing the target value to a modified target value, wherein the modified target value is a most frequently used value selected from a set of pre-stored values, and wherein based on the target value being greater than the setting value, each of the pre-stored values is lower than the setting value, or based on the target value being lower than the setting value, each of the pre-stored values is greater than the setting value,
   wherein the target value for the setting item is determined based on a historic usage pattern for the setting item on the user terminal.

2. The method of claim 1, wherein, the monitoring the setting value for the setting item comprises, in response to the setting value for the setting item being input into the user terminal, comparing the input setting value to the target value.

3. The method of claim 1, wherein, the monitoring the setting value for the setting item comprises, in response to a function corresponding to the setting item being executed in the user terminal, comparing the setting value for the setting item with the target value.

4. The method of claim 1, wherein the setting item is settable by a manual input having a plurality of steps in the user terminal.

5. The method of claim 1, wherein the target value for the setting item is determined as a value having a highest frequency of use in the historic usage pattern for the setting item.

6. The method of claim 1, wherein the generating the system speech comprises at least one of:
   in response to the setting value being less than the target value for the setting item, generating the system speech for confirming whether to increase the setting value for the setting item, or
   in response to the setting value being greater than the target value for the setting item, generating the system speech for confirming whether to decrease the setting value for the setting item.

7. The method of claim 1, wherein the generating the system speech comprises generating the system speech by including information about the setting value for the setting item.

8. The method of claim 1, wherein the generated system speech is preemptively output through the user terminal, before a speech input is received by the user terminal from a user.

9. The method of claim 1, further comprising:
   storing the historic usage pattern for the setting item, for each of a plurality of user terminals or for each of a plurality of users.

10. The method of claim 9, wherein the historic usage pattern for the setting item is stored according to at least one of time information, season information, location information, or occupant information.

11. A user terminal comprising:
an input interface configured to receive, from a user, a setting value for a setting item of a vehicle;
a controller configured to execute a function corresponding to the setting item according to the received setting value;
a communicator configured to receive, in response to the setting value not matching a target value for the setting item, a system speech from a dialogue system of the vehicle;
a speaker configured to output the received system speech; and
a microphone configured to receive, from the user, a speech input,
wherein the system speech is generated based on the target value and the received setting value, and
wherein in response to determining that content of the speech input indicates a modification of the target value, the controller is further configured to change the target value to a modified target value, wherein the modified target value is a most frequently used value selected from a set of pre-stored values, and wherein based on the target value being greater than the setting value, each of the pre-stored values is lower than the setting value, or based on the target value being lower than the setting value, each of the pre-stored values is greater than the setting value.

12. The user terminal of claim 11, wherein the setting item is set by a manual input having a plurality of steps in the user terminal.

13. The user terminal of claim 11, wherein the target value for the setting item is determined as a value having a highest frequency of use in a historic usage pattern for the setting item.

14. The user terminal of claim 11, wherein the system speech is output for confirming one of:
whether to increase the setting value for the setting item, in response to the setting value for the setting item being less than the target value for the setting item, or
whether to decrease the setting value for the setting item in response to the setting value for the setting item being greater than the target value for the setting item.

15. The user terminal of claim 11, wherein the system speech comprises information about the setting value for the setting item.

16. The user terminal of claim 11, wherein the system speech is preemptively output through the speaker, before the speech input is received by the microphone.

17. A dialogue system comprising:
a storage configured to store a historic usage pattern for a setting item on a user terminal;
a controller configured to:
monitor a setting value for the setting item;
in response to the setting value not matching a target value, which is determined based on the historic usage pattern for the setting item, generate a system speech based on the target value and the setting value;
detect a user speech received via the user terminal; and
in response to determining that content of the user speech indicates a modification of the target value, change the target value to a modified target value, wherein the modified target value is a most frequently used value selected from a set of pre-stored values, and wherein based on the target value being greater than the setting value, each of the pre-stored values is lower than the setting value, or based on the target value being lower than the setting value, each of the pre-stored values is greater than the setting value; and
a communicator configured to transmit the generated system speech to the user terminal.

18. The dialogue system of claim 17, wherein the controller is configured to monitor the setting value in response to the setting value being input to the user terminal.

19. The dialogue system of claim 17, wherein the controller is configured to monitor the setting value in response to a function corresponding to the setting item being executed in the user terminal.

20. The dialogue system of claim 17, wherein the setting item is set by a manual input having a plurality of steps in the user terminal.

* * * * *